US012730318B2

(12) United States Patent
Kimmel

(10) Patent No.: US 12,730,318 B2
(45) Date of Patent: Sep. 8, 2026

(54) EXIT PUPIL EXPANDER WITH TOTAL INTERNAL REFLECTION BETWEEN WEDGE SURFACES

(71) Applicant: Magic Leap, Inc., Plantation, FL (US)

(72) Inventor: Jyrki Sakari Kimmel, Tampere (FI)

(73) Assignee: Magic Leap, Inc., Plantation, FL (US)

( * ) Notice: Subject to any disclaimer, the term of this patent is extended or adjusted under 35 U.S.C. 154(b) by 277 days.

(21) Appl. No.: 18/432,547

(22) Filed: Feb. 5, 2024

(65) Prior Publication Data

US 2024/0176148 A1 May 30, 2024

Related U.S. Application Data

(63) Continuation of application No. 18/145,416, filed on Dec. 22, 2022, now Pat. No. 11,927,759, which is a (Continued)

(51) Int. Cl.
*G02B 27/00* (2006.01)
*G02B 27/01* (2006.01)
*G02B 27/42* (2006.01)

(52) U.S. Cl.
CPC ..... *G02B 27/0172* (2013.01); *G02B 27/0081* (2013.01); *G02B 27/4205* (2013.01); (Continued)

(58) Field of Classification Search
CPC .......... G02B 27/0081; G02B 2027/011; G02B 2027/0112; G02B 2027/0116; G02B 27/0172; G02B 27/4205
See application file for complete search history.

(56) References Cited

U.S. PATENT DOCUMENTS 4,344,092 A 8/1982 Miller
4,652,930 A 3/1987 Crawford
(Continued)

FOREIGN PATENT DOCUMENTS

CN 100416340 C 9/2008
CN 101449270 A 6/2009
(Continued)

OTHER PUBLICATIONS

"Communication Pursuant to Article 94(3) EPC mailed Nov. 28, 2024", European Patent Application No. 19885958.9, (5 pages).
(Continued)

*Primary Examiner* — Ryan S Dunning
(74) *Attorney, Agent, or Firm* — Stephen M. De Klerk

(57) ABSTRACT

An exit pupil expander (EPE) has entrance and exit pupils, a back surface adjacent to the entrance pupil, and an opposed front surface. In one embodiment the EPE is geometrically configured such that light defining a center wavelength that enters at the entrance pupil perpendicular to the back surface experiences angularly varying total internal reflection between the front and back surfaces such that the light exiting the optical channel perpendicular to the exit pupil is at a wavelength shifted from the center wavelength. In another embodiment a first distance at the entrance pupil between the front and back surfaces is different from a second distance at the exit pupil between the front and back surfaces. The EPE may be deployed in a head-wearable imaging device (e.g., virtual or augmented reality) where the entrance pupil in-couples light from a micro display and the exit pupil out-couples light from the EPE.

15 Claims, 8 Drawing Sheets

Related U.S. Application Data continuation of application No. 16/748,193, filed on Jan. 21, 2020, now Pat. No. 11,567,324, which is a continuation of application No. 15/659,732, filed on Jul. 26, 2017, now Pat. No. 10,578,870.

(52) U.S. Cl.
CPC ................ *G02B 2027/0112* (2013.01); *G02B 2027/0178* (2013.01)

(56) References Cited

U.S. PATENT DOCUMENTS 4,810,080 A 3/1989 Grendol et al.
4,997,268 A 3/1991 Dauvergne
5,007,727 A 4/1991 Kahaney et al.
5,074,295 A 12/1991 Willis
5,240,220 A 8/1993 Elberbaum
5,251,635 A 10/1993 Dumoulin et al.
5,410,763 A 5/1995 Bolle
5,455,625 A 10/1995 Englander
5,495,286 A 2/1996 Adair
5,497,463 A 3/1996 Stein et al.
5,659,701 A 8/1997 Amit et al.
5,682,255 A 10/1997 Friesem et al.
5,689,669 A 11/1997 Lynch
5,826,092 A 10/1998 Flannery
5,854,872 A 12/1998 Tai
5,864,365 A 1/1999 Sramek et al.
5,937,202 A 8/1999 Crosetto
6,002,853 A 12/1999 de Hond
6,012,811 A 1/2000 Chao et al.
6,016,160 A 1/2000 Coombs et al.
6,064,749 A 5/2000 Hirota et al.
6,076,927 A 6/2000 Owens
6,079,982 A 6/2000 Meader
6,117,923 A 9/2000 Amagai et al.
6,119,147 A 9/2000 Toomey et al.
6,124,977 A 9/2000 Takahashi
6,179,619 B1 1/2001 Tanaka
6,191,809 B1 2/2001 Hori et al.
6,219,045 B1 4/2001 Leahy et al.
6,243,091 B1 6/2001 Berstis
6,271,843 B1 8/2001 Lection et al.
6,362,817 B1 3/2002 Powers et al.
6,375,369 B1 4/2002 Schneider et al.
6,385,735 B1 5/2002 Wilson
6,396,522 B1 5/2002 Vu
6,414,679 B1 7/2002 Miodonski et al.
6,538,655 B1 3/2003 Kubota
6,541,736 B1 4/2003 Huang et al.
6,570,563 B1 5/2003 Honda
6,573,903 B2 6/2003 Gantt
6,590,593 B1 7/2003 Robertson et al.
6,621,508 B1 9/2003 Shiraishi et al.
6,690,393 B2 2/2004 Heron et al.
6,757,068 B2 6/2004 Foxlin
6,784,901 B1 8/2004 Harvey et al.
6,961,055 B2 11/2005 Doak
7,046,515 B1 5/2006 Wyatt
7,051,219 B2 5/2006 Hwang
7,076,674 B2 7/2006 Cervantes
7,111,290 B1 9/2006 Yates, Jr.
7,119,819 B1 10/2006 Robertson et al.
7,211,986 B1 5/2007 Flowerdew et al.
7,219,245 B1 5/2007 Raghuvanshi
7,382,288 B1 6/2008 Wilson
7,414,629 B2 8/2008 Santodomingo
7,431,453 B2 10/2008 Hogan
7,467,356 B2 12/2008 Gettman et al.
7,542,040 B2 6/2009 Templeman
7,573,640 B2 8/2009 Nivon et al.
7,653,877 B2 1/2010 Matsuda
7,663,625 B2 2/2010 Chartier et al.
7,724,980 B1 5/2010 Shenzhi
7,746,343 B1 6/2010 Charaniya et al.
7,751,662 B2 7/2010 Kleemann
7,758,185 B2 7/2010 Lewis
7,788,323 B2 8/2010 Greenstein et al.
7,804,507 B2 9/2010 Yang et al.
7,814,429 B2 10/2010 Buffet et al.
7,817,150 B2 10/2010 Reichard et al.
7,844,724 B2 11/2010 Van Wie et al.
8,060,759 B1 11/2011 Arnan et al.
8,120,851 B2 2/2012 Iwasa
8,214,660 B2 7/2012 Capps, Jr.
8,246,408 B2 8/2012 Elliot
8,353,594 B2 1/2013 Lewis
8,360,578 B2 1/2013 Nummela et al.
8,508,676 B2 8/2013 Silverstein et al.
8,547,638 B2 10/2013 Levola
8,605,764 B1 12/2013 Rothaar et al.
8,619,365 B2 12/2013 Harris et al.
8,696,113 B2 4/2014 Lewis
8,698,701 B2 4/2014 Margulis
8,733,927 B1 5/2014 Lewis
8,736,636 B2 5/2014 Kang
8,759,929 B2 6/2014 Shiozawa et al.
8,793,770 B2 7/2014 Lim
8,823,855 B2 9/2014 Hwang
8,847,988 B2 9/2014 Geisner et al.
8,874,673 B2 10/2014 Kim
9,010,929 B2 4/2015 Lewis
9,015,501 B2 4/2015 Gee
9,086,537 B2 7/2015 Iwasa et al.
9,095,437 B2 8/2015 Boyden et al.
9,239,473 B2 1/2016 Lewis
9,244,293 B2 1/2016 Lewis
9,244,533 B2 1/2016 Friend et al.
9,285,872 B1 3/2016 Raffle et al.
9,383,823 B2 7/2016 Geisner et al.
9,489,027 B1 11/2016 Ogletree
9,519,305 B2 12/2016 Wolfe
9,581,820 B2 2/2017 Robbins
9,582,060 B2 2/2017 Balatsos
9,658,473 B2 5/2017 Lewis
9,671,566 B2 6/2017 Abovitz et al.
9,671,615 B1 6/2017 Vallius et al.
9,696,795 B2 7/2017 Marcolina et al.
9,798,144 B2 10/2017 Sako et al.
9,874,664 B2 1/2018 Stevens et al.
9,880,441 B1 1/2018 Osterhout
9,918,058 B2 3/2018 Takahasi et al.
9,955,862 B2 5/2018 Freeman et al.
9,978,118 B1 5/2018 Ozgumer et al.
9,996,797 B1 6/2018 Holz et al.
10,018,844 B2 7/2018 Levola et al.
10,082,865 B1 9/2018 Raynal et al.
10,151,937 B2 12/2018 Lewis
10,185,147 B2 1/2019 Lewis
10,218,679 B1 2/2019 Jawahar
10,241,545 B1 3/2019 Richards et al.
10,317,680 B1 6/2019 Richards et al.
10,436,594 B2 10/2019 Belt et al.
10,516,853 B1 12/2019 Gibson et al.
10,527,853 B2 1/2020 Kimmel
10,551,879 B1 2/2020 Richards et al.
10,578,870 B2 3/2020 Kimmel
10,646,283 B2 5/2020 Johnson et al.
10,698,202 B2 6/2020 Kimmel et al.
10,825,424 B2 11/2020 Zhang
10,856,107 B2 12/2020 Mycek et al.
10,987,176 B2 4/2021 Poltaretskyi et al.
11,190,681 B1 11/2021 Brook et al.
11,199,713 B2 12/2021 Kimmel
11,209,656 B1 12/2021 Choi et al.
11,236,993 B1 2/2022 Hall et al.
11,262,585 B2 3/2022 Potnis et al.
11,874,468 B2 1/2024 Kimmel
11,900,626 B2 2/2024 Tang
2001/0010598 A1 8/2001 Aritake et al.
2001/0018667 A1 8/2001 Kim
2002/0007463 A1 1/2002 Fung
2002/0063913 A1 5/2002 Nakamura et al.
2002/0071050 A1 6/2002 Homberg

(56) References Cited

U.S. PATENT DOCUMENTS

2002/0095463 A1 7/2002 Matsuda
2002/0108064 A1 8/2002 Nunally
2002/0113820 A1 8/2002 Robinson et al.
2002/0122648 A1 9/2002 Mule' et al.
2002/0140848 A1 10/2002 Cooper et al.
2003/0028816 A1 2/2003 Bacon
2003/0048456 A1 3/2003 Hill
2003/0067685 A1 4/2003 Niv
2003/0077458 A1 4/2003 Korenaga et al.
2003/0080976 A1 5/2003 Satoh et al.
2003/0115494 A1 6/2003 Cervantes
2003/0218614 A1 11/2003 Lavelle et al.
2003/0219992 A1 11/2003 Schaper
2003/0226047 A1 12/2003 Park
2004/0001533 A1 1/2004 Tran et al.
2004/0021600 A1 2/2004 Wittenberg
2004/0025069 A1 2/2004 Gary et al.
2004/0042377 A1 3/2004 Nikoloai et al.
2004/0073822 A1 4/2004 Greco
2004/0073825 A1 4/2004 Itoh
2004/0111248 A1 6/2004 Granny et al.
2004/0113887 A1 6/2004 Pair et al.
2004/0174496 A1 9/2004 Ji et al.
2004/0186902 A1 9/2004 Stewart
2004/0193441 A1 9/2004 Altieri
2004/0201857 A1 10/2004 Foxlin
2004/0238732 A1 12/2004 State et al.
2004/0240072 A1 12/2004 Schindler et al.
2004/0246391 A1 12/2004 Travis
2004/0268159 A1 12/2004 Aasheim et al.
2005/0001977 A1 1/2005 Zelman
2005/0034002 A1 2/2005 Flautner
2005/0052621 A1 3/2005 Allen et al.
2005/0093719 A1 5/2005 Okamoto et al.
2005/0128212 A1 6/2005 Edecker et al.
2005/0157159 A1 7/2005 Komiya et al.
2005/0177385 A1 8/2005 Hull
2005/0231599 A1 10/2005 Yamasaki
2005/0273792 A1 12/2005 Inohara et al.
2006/0013435 A1 1/2006 Rhoads
2006/0015821 A1 1/2006 Jacques Parker et al.
2006/0019723 A1 1/2006 Vorenkamp
2006/0038880 A1 2/2006 Starkweather et al.
2006/0050224 A1 3/2006 Smith
2006/0090092 A1 4/2006 Verhulst
2006/0126181 A1 6/2006 Levola
2006/0126182 A1 6/2006 Levola
2006/0129852 A1 6/2006 Bonola
2006/0132914 A1 6/2006 Weiss et al.
2006/0179329 A1 8/2006 Terechko
2006/0221448 A1 10/2006 Nivon et al.
2006/0228073 A1 10/2006 Mukawa et al.
2006/0250322 A1 11/2006 Hall et al.
2006/0259621 A1 11/2006 Ranganathan
2006/0268220 A1 11/2006 Hogan
2007/0058248 A1 3/2007 Nguyen et al.
2007/0103836 A1 5/2007 Oh
2007/0124730 A1 5/2007 Pytel
2007/0159673 A1 7/2007 Freeman et al.
2007/0185398 A1 8/2007 Kimura et al.
2007/0188837 A1 8/2007 Shimizu et al.
2007/0198886 A1 8/2007 Saito
2007/0204672 A1 9/2007 Huang et al.
2007/0213952 A1 9/2007 Cirelli
2007/0283247 A1 12/2007 Brenneman et al.
2008/0002259 A1 1/2008 Ishizawa et al.
2008/0002260 A1 1/2008 Arrouy et al.
2008/0030429 A1 2/2008 Hailpern
2008/0043334 A1 2/2008 Itzkovitch et al.
2008/0046773 A1 2/2008 Ham
2008/0050013 A1 2/2008 Munro
2008/0063802 A1 3/2008 Maula et al.
2008/0068557 A1 3/2008 Menduni et al.
2008/0082480 A1 4/2008 Gounares et al.
2008/0125218 A1 5/2008 Collins
2008/0146942 A1 6/2008 Dala-Krishna
2008/0173036 A1 7/2008 Willaims
2008/0177506 A1 7/2008 Kim
2008/0183190 A1 7/2008 Adcox et al.
2008/0205838 A1 8/2008 Crippa et al.
2008/0215907 A1 9/2008 Wilson
2008/0225393 A1 9/2008 Rinko
2008/0235570 A1 9/2008 Sawada et al.
2008/0246693 A1 10/2008 Hailpern et al.
2008/0316768 A1 12/2008 Travis
2009/0076791 A1 3/2009 Rhoades et al.
2009/0091583 A1 4/2009 McCoy
2009/0153797 A1 6/2009 Allon et al.
2009/0177445 A1 7/2009 Capps, Jr. et al.
2009/0224416 A1 9/2009 Laakkonen et al.
2009/0245730 A1 10/2009 Kleemann
2009/0287728 A1 11/2009 Martine et al.
2009/0300528 A1 12/2009 Stambaugh
2009/0310633 A1 12/2009 Ikegami
2010/0005326 A1 1/2010 Archer
2010/0019962 A1 1/2010 Fujita
2010/0056274 A1 3/2010 Uusitalo et al.
2010/0060970 A1 3/2010 Harris et al.
2010/0060979 A1 3/2010 Harris et al.
2010/0063854 A1 3/2010 Purvis et al.
2010/0070378 A1 3/2010 Trotman et al.
2010/0079841 A1 4/2010 Levola
2010/0115428 A1 5/2010 Shuping et al.
2010/0153934 A1 6/2010 Lachner
2010/0194632 A1 8/2010 Raento et al.
2010/0205541 A1 8/2010 Rappaport et al.
2010/0214284 A1 8/2010 Rieffel et al.
2010/0232016 A1 9/2010 Landa et al.
2010/0232031 A1 9/2010 Batchko et al.
2010/0244168 A1 9/2010 Shiozawa et al.
2010/0274567 A1 10/2010 Carlson et al.
2010/0274627 A1 10/2010 Carlson
2010/0277803 A1 11/2010 Pockett et al.
2010/0284085 A1 11/2010 Laakkonen
2010/0287485 A1 11/2010 Bertolami et al.
2010/0296163 A1 11/2010 Sarikko
2010/0306715 A1 12/2010 Geisner et al.
2010/0309687 A1 12/2010 Sampsell et al.
2010/0321781 A1 12/2010 Levola
2011/0010636 A1 1/2011 Hamilton, II et al.
2011/0021263 A1 1/2011 Anderson et al.
2011/0022870 A1 1/2011 Mcgrane
2011/0041083 A1 2/2011 Gabai et al.
2011/0050640 A1 3/2011 Lundback et al.
2011/0050655 A1 3/2011 Mukawa
2011/0064268 A1 3/2011 Cobb et al.
2011/0122240 A1 5/2011 Becker
2011/0145617 A1 6/2011 Thomson et al.
2011/0170801 A1 7/2011 Lu et al.
2011/0182515 A1 7/2011 Iwai et al.
2011/0218733 A1 9/2011 Hamza et al.
2011/0286735 A1 11/2011 Temblay
2011/0291969 A1 12/2011 Rashid et al.
2011/0317233 A1 12/2011 Hayashibe et al.
2012/0011389 A1 1/2012 Driesen
2012/0050535 A1 3/2012 Densham et al.
2012/0075501 A1 3/2012 Oyagi et al.
2012/0079466 A1 3/2012 Gonion
2012/0081392 A1 4/2012 Arthur
2012/0089854 A1 4/2012 Breakstone
2012/0113235 A1 5/2012 Shintani
2012/0127062 A1 5/2012 Bar-Zeev et al.
2012/0154557 A1 6/2012 Perez et al.
2012/0215094 A1 8/2012 Rahimian et al.
2012/0218301 A1 8/2012 Miller
2012/0246506 A1 9/2012 Knight
2012/0249416 A1 10/2012 Maciocci et al.
2012/0249741 A1 10/2012 Maciocci et al.
2012/0260083 A1 10/2012 Andrews
2012/0280348 A1 11/2012 Chou et al.
2012/0307075 A1 12/2012 Margalitq
2012/0307362 A1 12/2012 Silverstein et al.
2012/0314959 A1 12/2012 White et al.
2012/0320460 A1 12/2012 Levola

(56) References Cited

U.S. PATENT DOCUMENTS

2012/0326948 A1 12/2012 Crocco et al.
2013/0021486 A1 1/2013 Richardon
2013/0050258 A1 2/2013 Liu et al.
2013/0050642 A1 2/2013 Lewis et al.
2013/0050833 A1 2/2013 Lewis et al.
2013/0051730 A1 2/2013 Travers et al.
2013/0061240 A1 3/2013 Yan et al.
2013/0077049 A1 3/2013 Bohn
2013/0077170 A1 3/2013 Ukuda
2013/0094148 A1 4/2013 Sloane
2013/0129282 A1 5/2013 Li
2013/0162940 A1 6/2013 Kurtin et al.
2013/0169923 A1 7/2013 Schnoll et al.
2013/0205126 A1 8/2013 Kruglick
2013/0222386 A1 8/2013 Tannhauser et al.
2013/0268257 A1 10/2013 Hu
2013/0278633 A1 10/2013 Ahn et al.
2013/0308861 A1 11/2013 Cordara
2013/0314789 A1 11/2013 Saarikko et al.
2013/0318276 A1 11/2013 Dalal
2013/0336138 A1 12/2013 Venkatraman et al.
2013/0342564 A1 12/2013 Kinnebrew et al.
2013/0342570 A1 12/2013 Kinnebrew et al.
2013/0342571 A1 12/2013 Kinnebrew et al.
2013/0343408 A1 12/2013 Cook
2014/0002329 A1 1/2014 Nishimaki et al.
2014/0013098 A1 1/2014 Yeung
2014/0016821 A1 1/2014 Arth et al.
2014/0022819 A1 1/2014 Oh et al.
2014/0078023 A1 3/2014 Ikeda et al.
2014/0082526 A1 3/2014 Park et al.
2014/0119598 A1 5/2014 Ramachandran et al.
2014/0123015 A1 5/2014 Sako et al.
2014/0126769 A1 5/2014 Reitmayr et al.
2014/0140653 A1 5/2014 Brown et al.
2014/0149573 A1 5/2014 Tofighbakhsh et al.
2014/0168260 A1 6/2014 O'Brien et al.
2014/0204438 A1 7/2014 Yamada et al.
2014/0244983 A1 8/2014 McDonald et al.
2014/0266987 A1 9/2014 Magyari
2014/0267419 A1 9/2014 Ballard et al.
2014/0274391 A1 9/2014 Stafford
2014/0282105 A1 9/2014 Nordstrom
2014/0292645 A1 10/2014 Tsurumi et al.
2014/0306866 A1 10/2014 Miller et al.
2014/0313228 A1 10/2014 Kasahara
2014/0340498 A1 11/2014 Plagemann et al.
2014/0359589 A1 12/2014 Kodsky et al.
2014/0375680 A1 12/2014 Ackerman et al.
2015/0005785 A1 1/2015 Olson
2015/0009099 A1 1/2015 Queen
2015/0077312 A1 3/2015 Wang
2015/0097719 A1 4/2015 Balachandreswaran et al.
2015/0123966 A1 5/2015 Newman
2015/0130790 A1 5/2015 Vazquez, II et al.
2015/0132003 A1 5/2015 Greiner et al.
2015/0132596 A1 5/2015 Yamada et al.
2015/0134995 A1 5/2015 Park et al.
2015/0138248 A1 5/2015 Schrader
2015/0155939 A1 6/2015 Oshima et al.
2015/0168221 A1 6/2015 Mao et al.
2015/0205126 A1 7/2015 Schowengerdt
2015/0235427 A1 8/2015 Nobori et al.
2015/0235431 A1 8/2015 Schowengerdt
2015/0253651 A1 9/2015 Russell et al.
2015/0256484 A1 9/2015 Cameron
2015/0269784 A1 9/2015 Miyawaki et al.
2015/0294483 A1 10/2015 Wells et al.
2015/0301955 A1 10/2015 Yakovenko et al.
2015/0310657 A1 10/2015 Eden
2015/0316982 A1 11/2015 Miller
2015/0338915 A1 11/2015 Publicover et al.
2015/0355481 A1 12/2015 Hilkes et al.
2016/0004102 A1 1/2016 Nisper et al.
2016/0015470 A1 1/2016 Border
2016/0027215 A1 1/2016 Burns et al.
2016/0033770 A1 2/2016 Fujimaki et al.
2016/0051217 A1 2/2016 Douglas et al.
2016/0073069 A1 3/2016 Xue
2016/0077338 A1 3/2016 Robbins et al.
2016/0085285 A1 3/2016 Mangione-Smith
2016/0085300 A1 3/2016 Robbins et al.
2016/0091720 A1 3/2016 Stafford et al.
2016/0093099 A1 3/2016 Bridges
2016/0093269 A1 3/2016 Buckley et al.
2016/0103326 A1 4/2016 Kimura et al.
2016/0123745 A1 5/2016 Cotier et al.
2016/0139402 A1 5/2016 Lapstun
2016/0139411 A1 5/2016 Kang et al.
2016/0155273 A1 6/2016 Lyren et al.
2016/0163063 A1 6/2016 Ashman
2016/0180596 A1 6/2016 Gonzalez del Rosario
2016/0187654 A1 6/2016 Border et al.
2016/0191887 A1 6/2016 Casas
2016/0202496 A1 7/2016 Billetz et al.
2016/0217624 A1 7/2016 Finn et al.
2016/0266412 A1 9/2016 Yoshida
2016/0267708 A1 9/2016 Nistico et al.
2016/0274733 A1 9/2016 Hasegawa et al.
2016/0277645 A1 9/2016 Bitouk
2016/0287337 A1 10/2016 Aram et al.
2016/0300388 A1 10/2016 Stafford et al.
2016/0321551 A1 11/2016 Priness et al.
2016/0327798 A1 11/2016 Xiao et al.
2016/0334279 A1 11/2016 Mittleman et al.
2016/0357255 A1 12/2016 Lindh et al.
2016/0370404 A1 12/2016 Quadrat et al.
2016/0370510 A1 12/2016 Thomas
2017/0038607 A1 2/2017 Camara
2017/0060225 A1 3/2017 Zha et al.
2017/0061696 A1 3/2017 Li et al.
2017/0064066 A1 3/2017 Das et al.
2017/0068020 A1 3/2017 Batchko et al.
2017/0100664 A1 4/2017 Osterhout et al.
2017/0102544 A1 4/2017 Vallius et al.
2017/0115487 A1 4/2017 Travis
2017/0118452 A1 4/2017 Ogi et al.
2017/0122725 A1 5/2017 Yeoh et al.
2017/0123526 A1 5/2017 Trail et al.
2017/0127295 A1 5/2017 Black et al.
2017/0131569 A1 5/2017 Aschwanden et al.
2017/0147066 A1 5/2017 Katz et al.
2017/0160518 A1 6/2017 Lanman et al.
2017/0161951 A1 6/2017 Fix et al.
2017/0172409 A1 6/2017 Cavin et al.
2017/0185261 A1 6/2017 Perez et al.
2017/0192239 A1 7/2017 Nakamura et al.
2017/0201709 A1 7/2017 Igarashi et al.
2017/0205903 A1 7/2017 Miller et al.
2017/0206668 A1 7/2017 Poulos et al.
2017/0213388 A1 7/2017 Margolis et al.
2017/0214893 A1 7/2017 Naftali et al.
2017/0214907 A1 7/2017 Lapstun
2017/0219841 A1 8/2017 Popovich et al.
2017/0220119 A1 8/2017 Potts et al.
2017/0221225 A1 8/2017 Peri
2017/0232345 A1 8/2017 Rofougaran et al.
2017/0235126 A1 8/2017 DiDomenico
2017/0235129 A1 8/2017 Kamakura
2017/0235142 A1 8/2017 Wall et al.
2017/0235144 A1 8/2017 Piskunov et al.
2017/0235147 A1 8/2017 Kamakura
2017/0243403 A1 8/2017 Daniels et al.
2017/0246070 A1 8/2017 Osterhout et al.
2017/0254832 A1 9/2017 Ho et al.
2017/0256096 A1 9/2017 Faaborg et al.
2017/0258526 A1 9/2017 Lang
2017/0266529 A1 9/2017 Reikmoto
2017/0270712 A1 9/2017 Tyson et al.
2017/0281054 A1 10/2017 Stever et al.
2017/0287376 A1 10/2017 Bakar et al.
2017/0293141 A1 10/2017 Schowengerdt et al.
2017/0307886 A1 10/2017 Stenberg et al.
2017/0307891 A1 10/2017 Bucknor et al.

(56) References Cited

U.S. PATENT DOCUMENTS

2017/0312032 A1 11/2017 Amanatullah et al.
2017/0322418 A1 11/2017 Lin et al.
2017/0322426 A1 11/2017 Tervo
2017/0329137 A1 11/2017 Tervo
2017/0332098 A1 11/2017 Rusanovskyy et al.
2017/0336636 A1 11/2017 Amitai et al.
2017/0336867 A1 11/2017 Wilairat et al.
2017/0357332 A1 12/2017 Balan et al.
2017/0363871 A1 12/2017 Vallius
2017/0371394 A1 12/2017 Chan
2017/0371661 A1 12/2017 Sparling
2018/0014266 A1 1/2018 Chen
2018/0024289 A1 1/2018 Fattal
2018/0039673 A1 2/2018 Chen et al.
2018/0044173 A1 2/2018 Netzer
2018/0052007 A1 2/2018 Teskey et al.
2018/0052501 A1 2/2018 Jones, Jr. et al.
2018/0056305 A1 3/2018 Sankey et al.
2018/0059305 A1 3/2018 Popovich et al.
2018/0067779 A1 3/2018 Pillalamarri et al.
2018/0070855 A1 3/2018 Eichler
2018/0082480 A1 3/2018 White et al.
2018/0084245 A1 3/2018 Lapstun
2018/0088185 A1 3/2018 Woods et al.
2018/0101214 A1 4/2018 Mahindru et al.
2018/0102981 A1 4/2018 Kurtzman et al.
2018/0108179 A1 4/2018 Tomlin et al.
2018/0114298 A1 4/2018 Malaika et al.
2018/0129112 A1 5/2018 Osterhout
2018/0131907 A1 5/2018 Schmirler et al.
2018/0136466 A1 5/2018 Ko
2018/0144691 A1 5/2018 Choi et al.
2018/0150971 A1 5/2018 Adachi et al.
2018/0151796 A1 5/2018 Akahane
2018/0172995 A1 6/2018 Lee et al.
2018/0188115 A1 7/2018 Hsu et al.
2018/0189568 A1 7/2018 Powderly et al.
2018/0190017 A1 7/2018 Mendez et al.
2018/0191990 A1 7/2018 Motoyama et al.
2018/0196084 A1 7/2018 Tustaniwskyj
2018/0217395 A1 8/2018 LIn et al.
2018/0218545 A1 8/2018 Garcia et al.
2018/0250589 A1 9/2018 Cossairt et al.
2018/0260218 A1 9/2018 Gopal
2018/0284877 A1 10/2018 Klein
2018/0292654 A1 10/2018 Wall et al.
2018/0299678 A1 10/2018 Singer et al.
2018/0357472 A1 12/2018 Dreessen
2019/0005069 A1 1/2019 Filgueiras de Araujo et al.
2019/0011691 A1 1/2019 Peyman
2019/0056591 A1 2/2019 Tervo et al.
2019/0087015 A1 3/2019 Lam et al.
2019/0101758 A1 4/2019 Zhu et al.
2019/0107723 A1 4/2019 Lee et al.
2019/0137788 A1 5/2019 Suen
2019/0155034 A1 5/2019 Singer et al.
2019/0155439 A1 5/2019 Mukherjee et al.
2019/0158926 A1 5/2019 Kang et al.
2019/0162950 A1 5/2019 Lapstun
2019/0167095 A1 6/2019 Krueger
2019/0171909 A1 6/2019 Mandal et al.
2019/0172216 A1 6/2019 Ninan et al.
2019/0178654 A1 6/2019 Hare
2019/0179654 A1 6/2019 Hare
2019/0182415 A1 6/2019 Sivan
2019/0196690 A1 6/2019 Chong et al.
2019/0206116 A1 7/2019 Xu et al.
2019/0219815 A1 7/2019 Price et al.
2019/0243123 A1 8/2019 Bohn
2019/0287270 A1 9/2019 Nakamura et al.
2019/0307510 A1 10/2019 Rotenberg et al.
2019/0318502 A1 10/2019 He et al.
2019/0318540 A1 10/2019 Piemonte et al.
2019/0321728 A1 10/2019 Imai et al.
2019/0347853 A1 11/2019 Chen et al.
2019/0380792 A1 12/2019 Poltaretskyi et al.
2019/0388182 A1 12/2019 Kumar et al.
2020/0066045 A1 2/2020 Stahl et al.
2020/0098188 A1 3/2020 Bar-Zeev et al.
2020/0100057 A1 3/2020 Galon et al.
2020/0110928 A1 4/2020 Al Jazaery et al.
2020/0117267 A1 4/2020 Gibson et al.
2020/0117270 A1 4/2020 Gibson et al.
2020/0184217 A1 6/2020 Faulkner
2020/0184653 A1 6/2020 Faulker
2020/0202759 A1 6/2020 Ukai et al.
2020/0242848 A1 7/2020 Ambler et al.
2020/0309944 A1 10/2020 Thoresen et al.
2020/0356161 A1 11/2020 Wagner
2020/0368616 A1 11/2020 Delamont
2020/0391115 A1 12/2020 Leeper et al.
2020/0409528 A1 12/2020 Lee
2021/0008413 A1 1/2021 Asikainen et al.
2021/0033871 A1 2/2021 Jacoby et al.
2021/0041951 A1 2/2021 Gibson et al.
2021/0053820 A1 2/2021 Gurin et al.
2021/0093391 A1 4/2021 Poltaretskyi et al.
2021/0093410 A1 4/2021 Gaborit et al.
2021/0093414 A1 4/2021 Moore et al.
2021/0097886 A1 4/2021 Kuester et al.
2021/0124901 A1 4/2021 Liu et al.
2021/0132380 A1 5/2021 Wieczorek
2021/0141225 A1 5/2021 Meynen et al.
2021/0142582 A1 5/2021 Jones et al.
2021/0150264 A1 5/2021 Karanam
2021/0158023 A1 5/2021 Fu et al.
2021/0158627 A1 5/2021 Cossairt et al.
2021/0173480 A1 6/2021 Osterhout et al.
2021/0319236 A1 10/2021 Tang
2021/0333551 A1 10/2021 Schultz
2022/0366598 A1 11/2022 Azimi et al.
2023/0351808 A1 11/2023 Jarvenpaa
2023/0384593 A1 11/2023 Ofir
2024/0103212 A1 3/2024 Jarvenpaa
2025/0039342 A1 1/2025 Traczyk et al.
2025/0189802 A1 6/2025 Ofir

FOREIGN PATENT DOCUMENTS

CN 102448566 A 5/2012
CN 103460255 A 12/2013
CN 104040410 A 9/2014
CN 104603675 A 5/2015
CN 105938426 A 9/2016
CN 106662754 A 5/2017
CN 107004303 A 8/2017
CN 107683497 A1 2/2018
CN 109223121 A 1/2019
CN 105190427 B 11/2019
EP 0504930 A1 3/1992
EP 0535402 A1 4/1993
EP 0632360 A1 1/1995
EP 1215522 A2 6/2002
EP 13451682 A2 2/2003
EP 1494110 A2 1/2005
EP 1938141 A1 7/2008
EP 1943556 A2 7/2008
EP 2290428 A2 3/2011
EP 2350774 A1 8/2011
EP 2818910 A1 12/2014
EP 1237067 B1 1/2016
EP 3139245 A1 3/2017
EP 3164776 B1 5/2017
EP 3236211 A1 10/2017
EP 2723240 B1 8/2018
EP 2896986 B1 2/2021
GB 2499635 A 8/2013
GB 2542853 A 4/2017
IN 938/DEL/2004 A 6/2006
JP H03-036974 U 4/1991
JP 09-121370 A 5/1997
JP H10-333094 A 12/1998
JP 2002-015222 A 1/2002
JP 2002-529806 9/2002

(56) References Cited

FOREIGN PATENT DOCUMENTS

JP 2003-029198 A 1/2003
JP 2003-141574 A 5/2003
JP 2003-228027 A 8/2003
JP 2003-329873 A 11/2003
JP 2004-348169 A 12/2004
JP 2005-151224 A 6/2005
JP 2005-303843 A 10/2005
JP 2007-012530 A 1/2007
JP 2007-86696 A 4/2007
JP 2007-273733 A 10/2007
JP 2008-257127 A 10/2008
JP 2009-090689 A 4/2009
JP 2009-244869 A 10/2009
JP 2010-014443 A 1/2010
JP 2010-139575 6/2010
JP 2010-146030 A 7/2010
JP 2010-526341 A 7/2010
JP 2010-271526 A 12/2010
JP 2011-033993 A 2/2011
JP 2011-504522 A 2/2011
JP 2011-257203 A 12/2011
JP 2011-530131 A 12/2011
JP 2012-8356 A 1/2012
JP 2012-15774 A 1/2012
JP 2012-015774 A 1/2012
JP 2012-088777 A 5/2012
JP 2012-235036 A 11/2012
JP 2013-525872 A1 6/2013
JP 2013-206322 A 10/2013
JP 2013-250045 A 12/2013
JP 2014-500522 A 1/2014
JP 2014-90386 A 5/2014
JP 2014-174366 A 9/2014
JP 2014-524229 A 9/2014
JP 2014-192550 A 10/2014
JP 2015-156512 A 8/2015
JP 2015-191032 A 11/2015
JP 2016-502120 A 1/2016
JP 2016-85463 A 5/2016
JP 2016-516227 A 6/2016
JP 2016-126134 A 7/2016
JP 2017-015697 A 1/2017
JP 2014-068465 A 4/2017
JP 2017-108444 A 6/2017
JP 2017-153498 9/2017
JP 2017-531840 A 10/2017
JP 2017-535825 A 11/2017
JP 6232763 B2 11/2017
JP 2018-014579 A 1/2018
JP 2018-503165 A 2/2018
JP 6333965 B2 5/2018
JP 2018-173739 A 11/2018
JP 2019-177134 A 10/2019
JP 7344896 B2 9/2023
KR 2005-0010775 A 1/2005
KR 10-2006-0059992 A 6/2006
KR 10-2011-0006408 1/2011
KR 10-1372623 B1 3/2014
KR 10-2017-0017243 2/2017
TW 201219829 A 5/2012
TW 201803289 A 1/2018
WO 1991/000565 A2 1/1991
WO 2000/030368 A1 6/2000
WO 2002/071315 A2 9/2002
WO 2004095248 A 11/2004
WO 2006132614 A1 12/2006
WO 2007037089 A1 4/2007
WO 2007041678 A2 4/2007
WO 2007/085628 A1 8/2007
WO 2007/085682 A1 8/2007
WO 2007/102144 A1 9/2007
WO 2008137299 A1 11/2008
WO 2008148927 A1 12/2008
WO 2009060125 A1 5/2009
WO 2009/101238 A1 8/2009
WO 2010015807 A1 2/2010
WO 2014203440 A1 12/2010
WO 2012030787 A2 3/2012
WO 2013/049012 A1 4/2013
WO 2013062701 A1 5/2013
WO 2013/145536 A1 10/2013
WO 2014033306 A1 3/2014
WO 2015079610 A1 6/2015
WO 2015/143641 A1 10/2015
WO 2015194597 A1 12/2015
WO 2016/054092 A1 4/2016
WO 2017004695 A1 1/2017
WO 2017044761 A1 3/2017
WO 2017049163 A1 3/2017
WO 2017051595 A1 3/2017
WO 2017120475 A1 7/2017
WO 2017176861 A1 10/2017
WO 2017/203201 A1 11/2017
WO 2018008232 A1 1/2018
WO 2018/031261 A1 2/2018
WO 2018022523 A1 2/2018
WO 2018/044537 A1 3/2018
WO 2018039273 A1 3/2018
WO 2018057564 A1 3/2018
WO 2018085287 A1 5/2018
WO 2018087408 A1 5/2018
WO 2018097831 A1 5/2018
WO 2018/166921 A 9/2018
WO 2018166921 A1 9/2018
WO 2018236587 A1 12/2018
WO 2019040493 A1 2/2019
WO 2016075689 A1 5/2019
WO 2019148154 A1 8/2019
WO 2020010226 A1 1/2020

OTHER PUBLICATIONS

"Communication Pursuant to Article 94(3) EPC mailed on Feb. 21, 2024", European Patent Application No. 20770244.0, (8 pages).
"Communication Pursuant to Article 94(3) EPC mailed on Feb. 7, 2025", European Patent Application No. 20154070.5, (7 pages).
"Communication Pursuant to Article 94(3) EPC mailed on Jul. 28, 2023", European Patent Application No. 19843487.0, (15 pages).
"Communication Pursuant to Article 94(3) EPC mailed on Mar. 11, 2024", European Patent Application No. 20798769.4, (12 pages).
"Communication Pursuant to Article 94(3) EPC mailed on Mar. 18, 2025", European Patent Application No. 19810142.0, (8 pages).
"Communication Pursuant to Article 94(3) EPC mailed on Nov. 21, 2024", European Patent Application No. 20846338.0, (11 pages).
"Extended European Search Report issued on Jan. 8, 2024", European Patent Application No. 23195266.4, (8 pages).
"Extended European Search Report issued on Apr. 25, 2024", European Patent Application No. 23208907.8, (9 pages).
"Extended European Search Report issued on Aug. 6, 2024", European Patent Application No. 24184599.9, (14 pages).
"Extended European Search Report issued on Dec. 2, 2024", European Patent Application No. 24167829.1, (7 pages).
"Extended European Search Report issued on Jul. 9, 2024", European Patent Application No. 24166847.4, (8 pages).
"Final Office Action mailed on Aug. 15, 2024 with English translation", Japanese Patent Application No. 2021-553297, (5 pages).
"Final Office Action mailed on Dec. 13, 2024 with English translation", Japanese Patent Application No. 2021-564496, (13 pages).
"Final Office Action mailed on May 24, 2024", U.S. Appl. No. 18/046,739, (52 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Jun. 20, 2024 with English translation", Japanese Patent Application No. 2021-564496, (14 pages).

(56) References Cited

OTHER PUBLICATIONS

"First Office Action mailed Jun. 24, 2024 with English translation", Japanese Patent Application No. 2022-504602, (7 pages).
"First Office Action mailed Mar. 1, 2024 with English translation", Japanese Patent Application No. 2021-553297, (5 pages).
"First Office Action mailed Mar. 20, 2024 with English translation", Chinese Patent Application No. 202080048293.4, (22 pages).
"First Office Action mailed Oct. 17, 2024 with English translation", Japanese Patent Application No. 2022-527990, (24 pages).
"First Office Action mailed on Dec. 11, 2023 with translation", Chinese Patent Application No. 201980032005.3, (17 pages).
"First Office Action mailed on Dec. 25, 2023 with English translation", Chinese Patent Application No. 2019800046303.8, (13 pages).
"First Office Action mailed on Feb. 1, 2024 with English translation", Chinese Patent Application No. 202080018865.4, (9 pages).
"First Office Action mailed on Mar. 25, 2024 with English translation", Chinese Patent Application No. 202080018919.7, (31 pages).
"First Office Action with English translation dated Aug. 8, 2024", Chinese Patent Application No. 202080053774.4, (23 pages).
"Non Final Office Action mailed on Apr. 16, 2025", U.S. Appl. No. 18/679,328, (10 pages).
"Non Final Office Action mailed on Feb. 26, 2024", U.S. Appl. No. 18/046,739, (48 pages).
"Non Final Office Action mailed on Jan. 3, 2025", U.S. Appl. No. 18/746,709, (31 pages).
"Non Final Office Action mailed on Jul. 20, 2023", U.S. Appl. No. 17/650,188, (11 pages).
"Non Final Office Action mailed on Jun. 17, 2024", U.S. Appl. No. 18/348,732, (19 pages).
"Non Final Office Action mailed on May 16, 2024", U.S. Appl. No. 18/361,546, (11 pages).
"Non Final Office Action mailed on Sep. 24, 2024", U.S. Appl. No. 18/597,716, (9 pages).
"Notice of Allowance mailed on Jul. 27, 2023 with English translation", Korean Patent Application No. 10-2020-7019685, (4 pages).
"Notice of Reasons for Rejection mailed on Dec. 4, 2024 with English tranlsation", Japanese Patent Application No. 2023-118968, (9 pages).
"Office Action mailed Feb. 20, 2025 with English translation", Japanese Patent Application No. 2024-135314, (6 pages).
"Office Action mailed on Apr. 16, 2025 with English Translation", Japanese Patent Application No. 2024-139589, (8 pages).
"Office Action mailed on Apr. 16, 2025 with English Translation", Japanese Patent Application No. 2022-527990, (9 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Jan. 22, 2025 with English translation", Japanese Patent Application No. 2024-63271, (8 pages).
"Office Action mailed on Jul. 20, 2023 with English translation", Japanese Patent Application No. 2021-505884, (6 pages).
"Office Action mailed on Mar. 17, 2025 with English Translation", Japanese Patent Application No. 2023-221068, (9 pages).
"Office Action mailed on Mar. 6, 2024 with English translation", Chinese Patent Application No. 201980053016.X, (7 pages).
"Office Action mailed on Nov. 7, 2024 with English translation", Korean Patent Application No. 10-2024-7032937, (7 pages).
"Office Action mailed on Nov. 8, 2023 with English translation", Chinese Patent Application No. 201980060018.1, (12 pages).
"Office Action mailed on Oct. 4, 2024 with English translation", Japanese Patent Application No. 2022-527710, (10 pages).
"Penultimate Office Action mailed on Apr. 9, 2024—English translation", Japanese Patent Application No. 2021-535716, (5 pages).
"Penultimate Office Action mailed on Sep. 17, 2024 with English translation", Japanese Patent Application No. 2023-115047, (7 pages).
"Second Office Action with English translation mailed on Jul. 2, 2024", Chinese Patent Application No. 201980032005.3, (15 pages).
"Second Office Action with English translation mailed on Mar. 25, 2025", Chinese Patent Application No. 202080053774.4, (11 pages).
"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).
"First Office Action mailed Apr. 22, 2025 with English translation", Chinese Patent Application No. 202211347201.X, (11 pages).
"Non Final Office Action mailed on Jun. 17, 2025", U.S. Appl. No. 18/674,016, (7 pages).
"Non Final Office Action mailed on Jun. 26, 2025", U.S. Appl. No. 18/348,732, (17 pages).
"Office Action mailed on Jul. 17, 2025 with English translation", Chinese Patent Application No. 202080079136.X, (42 pages).
"Penultimate Office Action mailed on Aug. 13, 2025 with English translation", Japanese Patent Application No. 2024-139589, (5 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Feb. 28, 2023", European Patent Application No. 19845418.3, (6 Pages).
"Communication Pursuant to Article 94(3) EPC mailed on Jan. 4, 2022", European Patent Application No. 20154070.5, (8 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Oct. 21, 2021", European Patent Application No. 16207441.3, (4 pages).
"Communication Pursuant to Article 94(3) EPC mailed on Oct. 6, 2023", European Patent Application No. 19851373.1, (6 pages).
"Communication Pursuant to Rule 164(1) EPC mailed on Feb. 23, 2022", European Patent Application No. 20753144.3, (11 pages).
"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).

(56) References Cited

OTHER PUBLICATIONS

"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).
"Final Office Action mailed Oct. 16, 2023", U.S. Appl. No. 17/098,043, (7 pages).
"Final Office Action mailed on Aug. 10, 2020", U.S. Appl. No. 16/225,961, (13 pages).
"Final Office Action mailed on Dec. 1, 2023", U.S. Appl. No. 17/357,795, (18 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed Nov. 2, 2023 with English translation", Chinese Patent Application No. 201980090867.1, (16 pages).
"First Office Action mailed on Apr. 13, 2023 with English Translation", Japanese Patent Application No. 2020-567766, (7 pages).
"First Office Action mailed on Dec. 22, 2022 with English translation", Chinese Patent Application No. 201980061450.2, (11 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"First Office Action mailed Sep. 29, 2023 with English translation", Japanese Patent Application No. 2023-10887, (5 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).

(56) References Cited

OTHER PUBLICATIONS

"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).
"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"Multi-core processor", TechTarget , 2013 , (1 page).
"Non Final Office Action mailed Nov. 19. 2019", U.S. Appl. No. 16/355,611, (31 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).
"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Non Final Office Action mailed on Nov. 5, 2020", U.S. Appl. No. 16/530,776, (45 pages).
"Non Final Office Action mailed on Oct. 11, 2023", U.S. Appl. No. 17/357,795, (14 pages).
"Non Final Office Action mailed on Oct. 22, 2019", U.S. Appl. No. 15/859,277, (15 pages).
"Non Final Office Action mailed on Oct. 24, 2023", U.S. Appl. No. 17/259,020, (21 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 29, 2021", U.S. Appl. No. 16/748,193, (62 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).

(56) References Cited

OTHER PUBLICATIONS

"Notice of Reason of Refusal mailed on Sep. 11, 2020 with English translation", Japanese Patent Application No. 2019-140435, (6 pages).
"Office Action mailed May 31, 2023", Israeli Patent Application No. 275373, (5 pages).
"Office Action mailed Nov. 21, 2023 with English Translation", Japanese Patent Application No. 2021-535716, (15 pages).
"Office Action mailed on Apr. 13, 2023 with English translation", Japanese Patent Application No. 2020-533730, (13 pages).
"Office Action mailed on Jun. 8, 2023 with English translation", Japanese Patent Application No. 2021-503762, (6 pages).
"Office Action mailed on Mar. 30, 2023 with English translation", Japanese Patent Application No. 2020-566620, (10 pages).
"Office Action mailed on Nov. 24, 2022 with English Translation", Japanese Patent Application No. 2020-533730, (11 pages).
"Office Action mailed on Nov. 7, 2023 with English translation", Korean Patent Application No. 10-2023-7036734, (5 pages).
"Penultimate Office Action mailed on Oct. 19, 2023 with English translation", Japanese Patent Application No. 2021-509779, (5 pages).
"Phototourism Challenge", CVPR 2019 Image Matching Work-shop. https://image matching-workshop. github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Second Office Action mailed on Sep. 25, 2023 with English translation", Japanese Patent Application No. 2020-567853, (8 pages).
"Summons to attend oral proceedings pursuant to Rule 115(1) EPC mailed on Jul. 15, 2019", European Patent Application No. 15162521.7, (7 pages).
Aarik, J. , et al. , "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022].
Arandjelović, Relja , et al. , "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>.
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Battaglia, Peter W, et al. , "Relational inductive biases, deep learning, and graph networks", arXiv:1806.01261, Oct. 17, 2018, pp. 1-40.
Berg, Alexander C , et al. , "Shape matching and object recognition using low distortion correspondences", In CVPR, 2005, (8 pages).
Bian, Jiawang , et al. , "GMS: Grid-based motion statistics for fast, ultra-robust feature correspondence.", In CVPR (Conference on Computer Vision and Pattern Recognition), 2017, (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Chittineni, C. , et al. , "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela , et al. , "ScanNet: Richly-annotated 3d reconstructions of indoor scenes", In CVPR, arXiv:1702.04405v2 [cs.CV] Apr. 11, 2017, (22 pages).
Deng, Haowen , et al. , "PPFnet: Global context aware local features for robust 3d point matching", In CVPR, arXiv:1802.02669v2 [cs.CV] Mar. 1, 2018, (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016, (6 pages).
Detone, Daniel , et al. , "Self-improving visual odometry", arXiv:1812.03245, Dec. 8, 2018, (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai , et al. , "D2-net: A trainable CNN for joint detection and description of local features", CVPR, arXiv:1905.03561v1 [cs.CV] May 9, 2019, (16 pages).
Ebel, Patrick , et al. , "Beyond cartesian representations for local descriptors", ICCV, arXiv:1908.05547v1 [cs.CV] Aug. 15, 2019, (11 pages).
Fischler, Martin A , et al. , "Random sample consensus: a paradigm for model fitting with applications to image analysis and automated cartography", Communications of the ACM, 24(6): 1981, pp. 381-395.
Gilmer, Justin , et al. , "Neural message passing for quantum chemistry", In ICML, arXiv:1704.01212v2 [cs.LG] Jun. 12, 2017, (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide—Titania (TiO2)", AZO Materials; Publication [online]. Jan. 11, 2002 [retrieved Feb. 19, 2020]. Retrieved from the Internet: < URL: https://www.azom.com/article.aspx?Article1D=1179>.
Hartley, Richard , et al. , "Multiple View Geometry in Computer Vision", Cambridge University Press, 2003, pp. 1-673.
Jacob, Robert J.K. , "Eye Tracking in Advanced Interface Design", Human-Computer Interaction Lab, Naval Research Laboratory, Washington, D.C., date unknown. 2003, pp. 1-50.

(56) References Cited

OTHER PUBLICATIONS

Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame- work for attention-based permutation-invariant neural networks", ICML, arXiv:1810.00825v3 [cs.LG] May 26, 2019, (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay May 14, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 DIGEST, 2006 SID International Symposium, Society for Information Display, vol. XXXVII, May 24, 2005, chapters 1-3, figures 1 and 3, pp. 64-67.
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Li, Yujia , et al. , "Graph matching networks for learning the similarity of graph structured objects", ICML, arXiv:1904.12787v2 [cs.LG] May 12, 2019, (18 pages).
Li, Zhengqi , et al. , "Megadepth: Learning single-view depth prediction from internet photos", In CVPR, fromarXiv: 1804.00607v4 [cs.CV] Nov. 28, 2018, (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007, pp. 657-690.
Lowe, David G , "Distinctive image features from scale-invariant keypoints", International Journal of Computer Vision, 60(2): 91-110, 2004, (28 pages).
Luo, Zixin , et al. , "ContextDesc: Local descriptor augmentation with cross-modality context", CVPR, arXiv:1904.04084v1 [cs.CV] Apr. 8, 2019, (14 pages).
Luo, Zixin , et al. , "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], pp. 2522-2531.
Memon, F. , et al. , "Synthesis, Characterization and Optical Constants of Silicon Oxycarbide", EPJ Web of Conferences; Publication [online). Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).
Paszke, Adam , et al. , "Automatic differentiation in Pytorch", 31st Conference on Neural Information Processing Systems (NIPS 2017), Long Beach, CA, USA, (4 pages).
Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R , et al. , "Pointnet: Deep Learning on Point Sets for 3D Classification and Segmentation", CVPR, arXiv:1612.00593v2 [cs.CV] Apr. 10, 2017, (19 pages).
Radenović, Filip , et al. , "Revisiting Oxford and Paris: Large-Scale Image Retrieval Benchmarking", CVPR, arXiv:1803.11285v1 [cs.CV] Mar. 29, 2018, (10 pages).
Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René , et al. , "Deep fundamental matrix estimation", European Conference on Computer Vision (ECCV), 2018, (17 pages).
Revaud, Jerome , et al. , "R2D2: Repeatable and Reliable Detector and Descriptor", In NeurIPS, arXiv:1906.06195v2 [cs.CV] Jun. 17, 2019, (12 pages).
Rocco, Ignacio , et al. , "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).
Sarlin , et al. , "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten , et al. , "SCRAMSAC: Improving RANSAC's efficiency with a spatial consistency filter", ICCV, 2009: 2090-2097., (8 pages).
Schonberger, Johannes Lutz, et al. , "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al. , "Structure-from-motion revisited", Proceedings of the IEEE Conference on Computer Vision and Pattern Recognition (CVPR), 2016, pp. 4104-4113, (11 pages).
Sheng, Liu , et al. , "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, ISSN: 0146-9592, pp. 1642-1644.
Sinkhorn, Richard , et al. , "Concerning nonnegative matrices and doubly stochastic matrices.", Pacific Journal of Mathematics, 1967, pp. 343-348.
Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart , et al. , "YFCC100m: The new data in multimedia research", Communications of the ACM, 59(2):64-73, 2016; arXiv:1503.01817v2 [cs.MM] Apr. 25, 2016, (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne , et al. , "Wide baseline stereo matching based on local, affinely invariant regions", BMVC, 2000, pp. 1-14.

(56) References Cited

OTHER PUBLICATIONS

Ulyanov, Dmitry , et al. , "Instance normalization: The missing ingredient for fast stylization", arXiv:1607.08022v3 [cs.CV] Nov. 6, 2017, (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar , et al. , "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong , et al. , "Non-local neural networks", CVPR, arXiv:1711.07971v3 [cs.CV] Apr. 13, 2018, (10 pages).
Wang, Yue , et al. , "Deep Closest Point: Learning representations for point cloud registration", ICCV, arXiv:1905.03304v1 [cs.CV] May 8, 2019, (10 pages).
Wang, Yue , et al. , "Dynamic Graph CNN for learning on point clouds", ACM Transactions on Graphics, arXiv:1801.07829v2 [cs. CV] Jun. 11, 2019, (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018, (13 pages).
Yi, Kwang Moo , et al. , "Lift: Learned invariant feature transform", ECCV, arXiv:1603.09114v2 [cs.CV] Jul. 29, 2016, (16 pages).
Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui , et al. , "Learning two-view correspondences and geometry using order-aware network", ICCV; aarXiv:1908.04964v1 [cs.CV] Aug. 14, 2019, (11 pages).
Zhang, Li , et al. , "Dual graph convolutional net-work for semantic segmentation", BMVC, 2019; arXiv:1909.06121v3 [cs.CV] Aug. 26, 2020, (18 pages).
Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.
"Non Final Office Action mailed on Dec. 2, 2025", U.S. Appl. No. 18/517,915, (18 pages).
"Final Office Action mailed on Dec. 17, 2025", U.S. Appl. No. 18/674,016, (8 pages).
"First Office Action mailed Dec. 20, 2025 with English translation", Chinese Patent Application No. 202080079114.3, (10 pages).
"Non Final Office Action mailed on Feb. 3, 2026", U.S. Appl. No. 18/643,757, (14 pages).
"Second Office Action with English translation mailed on Feb. 24, 2026", Chinese Patent Application No. 202080079136.X, (52 pages).
"First Office Action mailed Mar. 11, 2026 with English translation", Japanese Patent Application No. 2025-94021, (10 pages).
"Office Action mailed on Mar. 17, 2026 with English translation", Japanese Patent Application No. 2025-087496, (14 pages).
"Second Office Action with English translation mailed on May 29, 2026", Chinese Patent Application No. 202080079114.3, (5 pages).
"Notice of Allowance and Examiner-Initiated Interview Summary mailed on Jun. 23, 2026", U.S. Appl. No. 18/830,108, (12 pages).
Leydon, Krispin, "Sensing the Position & Orientation of Hand-Held Objects: An Overview of Techniques", UL-CSIS-03-02 IDC Dec. 3, 2001 (Year: 2001), (15 pages).
Yin, et al., "Design of Six Degrees of Freedom Electromagnetic Tracker for Virtual Reality System", 2012 IEEE International Conference on Virtual Environments Human-Computer Interfaces and Measurement Systems (VECIMS) Proceedings (Year: 2012), (4 pages).

FIG. 1: Prior Art
100: EPE
102: incident light
104: back surface
106: input grating
108: output grating
110: front surface
$d \sin \theta_m = m\lambda$
$\theta_i^{R,G,B}$ 200: EPE
202: incident light
204: back surface
206: input grating
208: output grating
210: front surface
220
222
$\alpha$
$\theta_i^{R,G,B}$
$\theta_i^{R,G,B} - \alpha$
$\theta_i^{R,G,B} - 3\alpha$
$\theta_m^{R,G,B}$ Example of calculation showing the magnitude of the wavelength shift for a 0,25 degree wedge Diffraction theory: $d(\sin(\theta_m)+\sin(\theta_i)=m\lambda$ Wedge theory Example

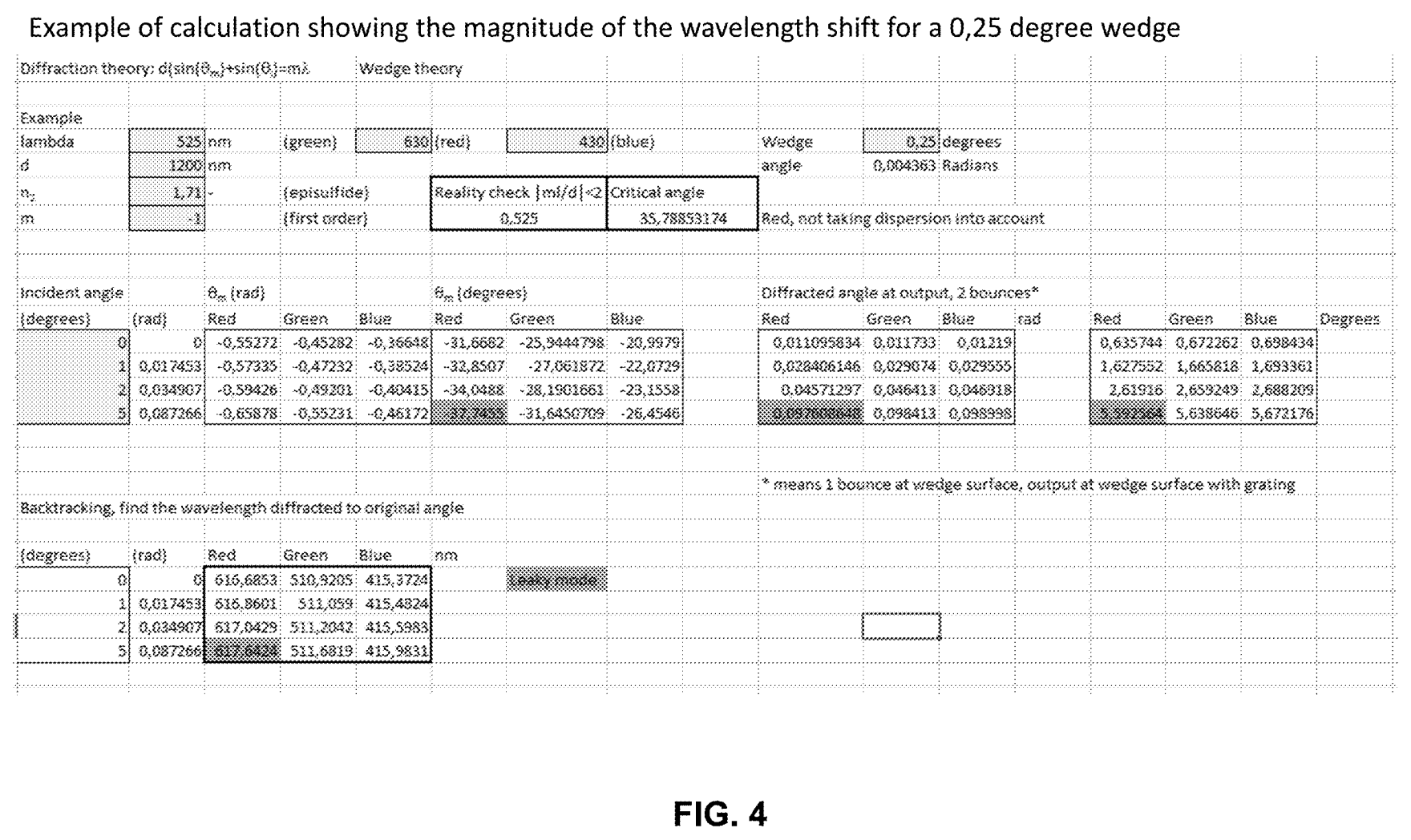

| | | | | | | | | | | |
|---|---|---|---|---|---|---|---|---|---|---|
| lambda | 525 | nm | (green) | 630 | (red) | 430 | (blue) | Wedge | 0,25 | degrees |
| d | 1200 | nm | | | | | | angle | 0,004363 | Radians |
| $n_2$ | 1,71 | - | (episulfide) | Reality check \|mλ/d\|<2 | | Critical angle | | | | |
| m | -1 | | (first order) | 0,525 | | 35,78853174 | | Red, not taking dispersion into account | | |

| Incident angle | | $\theta_m$ (rad) | | | $\theta_m$ (degrees) | | | Diffracted angle at output, 2 bounces* | | | | | | | |
|---|---|---|---|---|---|---|---|---|---|---|---|---|---|---|---|
| (degrees) | (rad) | Red | Green | Blue | Red | Green | Blue | Red | Green | Blue | rad | Red | Green | Blue | Degrees |
| 0 | 0 | -0,55272 | -0,45282 | -0,36648 | -31,6682 | -25,9444798 | -20,9979 | 0,011095834 | 0,011733 | 0,01219 | | 0,635744 | 0,672262 | 0,698434 | |
| 1 | 0,017453 | -0,57335 | -0,47232 | -0,38524 | -32,8507 | -27,061872 | -22,0729 | 0,028406146 | 0,029074 | 0,029555 | | 1,627552 | 1,665818 | 1,693361 | |
| 2 | 0,034907 | -0,59426 | -0,49201 | -0,40415 | -34,0488 | -28,1901661 | -23,1558 | 0,04571297 | 0,046413 | 0,046918 | | 2,61916 | 2,659249 | 2,688209 | |
| 5 | 0,087266 | -0,65878 | -0,55231 | -0,46172 | 37,7455 | -31,6450709 | -26,4546 | [illegible] | 0,098413 | 0,098998 | | [illegible] | 5,638646 | 5,672176 | |

* means 1 bounce at wedge surface, output at wedge surface with grating

Backtracking, find the wavelength diffracted to original angle

| (degrees) | (rad) | Red | Green | Blue | nm | |
|---|---|---|---|---|---|---|
| 0 | 0 | 616,6853 | 510,9205 | 415,3724 | | Leaky mode |
| 1 | 0,017453 | 616,8601 | 511,059 | 415,4824 | | |
| 2 | 0,034907 | 617,0429 | 511,2042 | 415,5983 | | |
| 5 | 0,087266 | [illegible] | 511,6819 | 415,9831 | | |

FIG. 4

200: EPE
206: input grating
202: incident light
850: pupil
208: output grating
p1
p2
p3

(inset)
Intensity (A. U.)
Wavelength (nm)
400
800

EXIT PUPIL EXPANDER WITH TOTAL INTERNAL REFLECTION BETWEEN WEDGE SURFACES

CROSS-REFERENCE TO RELATED APPLICATIONS

This is a continuation of U.S. patent application Ser. No. 18/145,416 filed on Dec. 22, 2022, which is a continuation of U.S. patent application Ser. No. 16/748,193, filed on Jan. 21, 2020 now U.S. Pat. No. 11,567,324, which is a continuation of U.S. patent application Ser. No. 15/659,732, filed on Jul. 26, 2017, now U.S. Pat. No. 10,578,870, all of which are incorporated herein by reference in their entirety.

TECHNOLOGICAL FIELD

The described invention relates to optical channels, and more particularly to controlling the color space across the output grating of an optical exit pupil expander such as may be disposed in a head-wearable imaging device/computer that projects an image directly in front of a user's eye.

BACKGROUND

Certain wearable computers such as those embodied as eyeglasses or virtual technology goggles project an image directly in front of a user's eye. In eyeglass type devices these projections are see-through so the user can see the projected data in the near field while the visual real-world in the far field remains largely unobscured. In virtual reality devices the user is isolated from perceiving the real world so the display needs to fill the user's entire field of vision. One challenge with such wearable displays is to produce an adequate eye-box in which the viewer can view the data that is projected by the micro-display. Such an the eye-box for see-through displays measures about 10-12 mm in the vertical and in the horizontal and the eye relief is in the range of 20-30 mm. For virtual reality devices the eye box is necessarily larger and often the eye relief is a bit longer. Retinal scanning display devices project the image directly on the user's retina so the eye-box is smaller and the eye relief is closer to zero. Due to the nature of such wearable devices the space constraints limit the reach of the optics and so one challenge is to keep that eye-box from shrinking to only a few mm, given the optical train (often located at the side of the user's head for see-through displays) is limited by practical limits to the size of such wearable devices. These size limits to the optical train also adversely affect the color space seen by the user. Color space may be a peripheral matter for see through displays where only data is being displayed but is critical for virtual reality devices whose effectiveness relies on the display persuading a certain level of the user's consciousness that the scene represents more than only a virtual world.

The exit pupil expander (EPE) is the optical component that would replace the geometric optics that have traditionally been used to expand the size of the eye-box in head-wearable visual devices. In optics the exit pupil is a virtual aperture in that only rays which pass through this virtual aperture can exit the system. The exit pupil is the image of the aperture stop in the optics that follow it. The term exit pupil is sometimes also used to refer to the diameter of the virtual aperture. Unlike the optics of conventional cameras or telescopes, an exit pupil expander of a wearable virtual reality or see-through device is designed to display for near-distance viewing.

Numerical aperture expander is a less common term sometimes used with reference to retinal scanning displays which project an image through the pupil directly on the user's retina. The numerical aperture of the light emanating from display pixels determines the exit pupil size, and retinal scanning displays project a rastered image about the size of the user's eye pupil at an intermediate plane. Retinal scanning displays can be used for virtual reality applications.

Diffractive exit pupil expanders have diffraction gratings that pose an inherent problem in controlling the color space. Because of diffraction the input and output gratings diffract different color bands of light into different output angles. This results in the user's perception of the color space of the scene being displayed having a varying color balance across the user's field of view.

Conventional exit pupil expanders typically have a very high degree of parallelism which FIG. 1 demonstrates with parallel front and back surfaces of the EPE. Incident light 102 enters the EPE 100 via the back surface 104 and encounters an input grating 106. Light propagates inside the EPE 100 by multiple total internal reflections (TIR) and the color space is controlled by having a stack of EPE plates, for example separate plates for red (R) and green (G) as well as blue (B) primary color bands. Light exiting the EPE 100 is expanded by these internal reflections and passes through an output grating 108 and exits normal to the front surface 110, which is parallel to the opposed back surface 104. This plate stacking necessarily complicates the design and raises its cost. The individual beams in FIG. 1 represent different colors (R, G, B) each defining a different wavelength λ.

SUMMARY

According to a first aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength.

According to a second aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is configured such that a first distance at the entrance pupil between the front surface and the back surface is different from a second distance at the exit pupil between the front surface and the back surface.

According to a third aspect of these teachings there is a head-wearable imaging device comprising a micro display and an exit pupil expander. The head-wearable imaging device may for example be a virtual reality device or an augmented reality device. In either case the exit pupil expander comprises: an entrance pupil configured to in-couple light from the micro-display; an exit pupil configured to out-couple light from the exit pupil expander; a back surface adjacent to the entrance pupil; and a front surface opposite the back surface. In this embodiment, as with the optical channel of the first aspect, the exit pupil expander is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. In another embodiment the exit pupil expander may be as described above for the optical channel according to the second aspect of these teachings.

BRIEF DESCRIPTION OF THE DRAWINGS

FIG. 1 is a schematic diagram illustrating a prior art exit pupil expander with parallel front and back surfaces according to the prior art.

FIG. 4 quantitatively tabulates the color shift of red, green and blue light passing through a wedge-shaped EPE such as that shown at FIG. 2, with $\alpha$=0.25 degrees.

DETAILED DESCRIPTION

Figure 2:
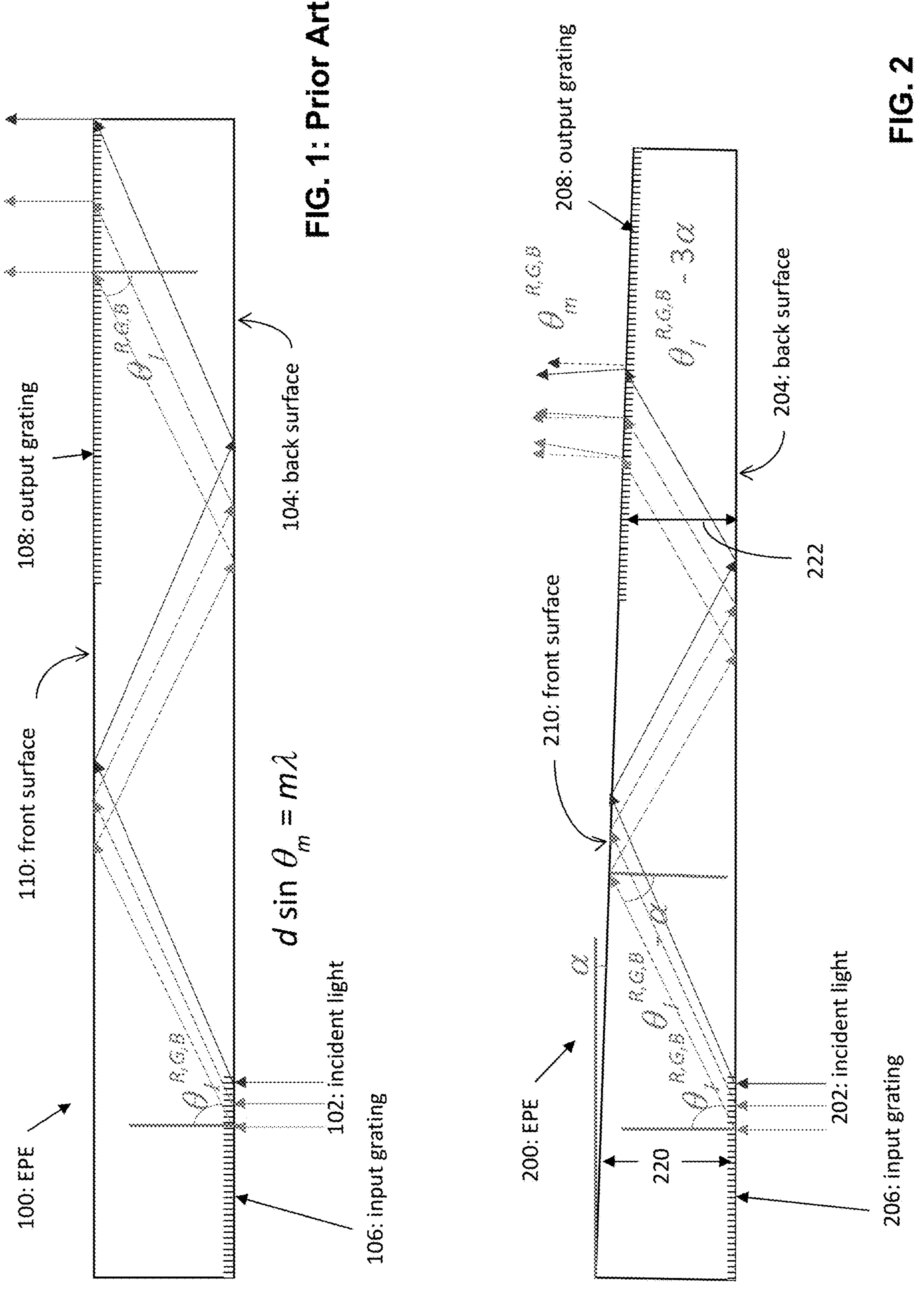
FIG. 2 is a schematic diagram illustrating a wedge-shaped exit pupil expander with non-parallel front and back surfaces according to an embodiment of these teachings.

Certain non-limiting embodiments of these teachings provide a wedge-shaped EPE (exit pupil expander) plate for controlling color space as generally shown at FIG. 2. In the wedge-shaped EPE 200, the front 210 and opposed back 204 surfaces of the EPE 200 are non-parallel. These surfaces 204, 210 refer to internal reflective surfaces upon which the light reflects within the optical channel/EPE 200 and are sometimes referred to as plates. Light 202 propagates inside the EPE 200 through total internal reflection from these surfaces 204, 210 and experiences a varying degree of angular variation due to non-parallelism of these surfaces/plates 204, 210. Hence, at the output grating 208, the angular spread of the out-coupled light is affected and a user sees the angular shift as a color change of the light source as compared to the incident light 202 that was input through the back surface 204 at the input grating 206. That is, the wedge-shaped EPE 200 shifts the diffracted light from the central emitted wavelength of the light source, which in FIG. 2 is represented as the incident light 202. Improved color balance is achieved by controlling the wedge-shape of the EPE 200.

More particularly, the light reflecting off these surfaces 204, 210 propagating inside the wedge-shaped EPE 200 by TIR experiences a varying degree of angular variation, as a result of the non-parallelism of the surfaces/plates 204, 210. This affects the angular spread of the out-coupled light that exits the EPE 200 through the front surface 210 at the output grating 208. In particular, if light-emitting diodes (LEDs) are used as light sources (the incident light 202) for the optical engine providing the image, the user will see the resulting angular shift as a color change of the light source because the diffracted light is shifted from the dominant or from the central-emitted wavelength of the LED. The light that is coupled in with a slightly different wavelength is indicated by dashed arrows in FIG. 2 that exit normal/perpendicular to the front surface 210 while light at the wavelength peak exits somewhat offset from the normal. An improved color balance in the overall system can be achieved by controlling the wedge shape of the EPE 200, more particularly by controlling the extent of the non-parallelism of the internal reflective surfaces/plates 202, 210.

The optical channel/EPE 200 of FIG. 2 is configured such that a first distance 220 at the entrance pupil/input grating 206 between the front surface 210 and the back surface 204 is different from a second distance 222 at the exit pupil/output grating 208 between the front surface 210 and the back surface 204. The specific location of these distances 220, 222 in FIG. 2 is to avoid obscuring the ray traces through the channel; the appropriate locations would follow one particular ray of a given wavelength from input to output pupil (which are delineated in the drawings as input and output gratings) of the channel/EPE 200. In a particular but non-limiting embodiment the extent of the wedge is such that this wavelength ray tracing is not relevant to these distances, where for example a smallest first distance 220 anywhere along the entrance pupil/input grating 206 is larger than a largest second distance 222 anywhere along the exit pupil/output grating 208.

Consider this distinction between FIGS. 1 and 2 quantitatively. Assuming for simplicity that the characteristics of the input grating and the output grating are identical, the output coupled light experiences a color shift across the output grating. The grating equation $d \sin \theta_m = m\lambda$ (also shown at FIG. 1) describes the coupling angle of the light for each central wavelength $\lambda$ for Red, Green, and Blue. In FIG. 2, the improved color balance achieved by the wedged plates 204, 210 is shown. If the wedge angle $\alpha$ shown at FIG. 2 is chosen appropriately, the color shift across the output grating 208 is offset by the shift in the central wavelength of the respective light sources for R, G, and B. In FIG. 2 the central wavelength is followed with solid lines, and the shifted wavelengths are shown in dashed lines.

Figure 3:
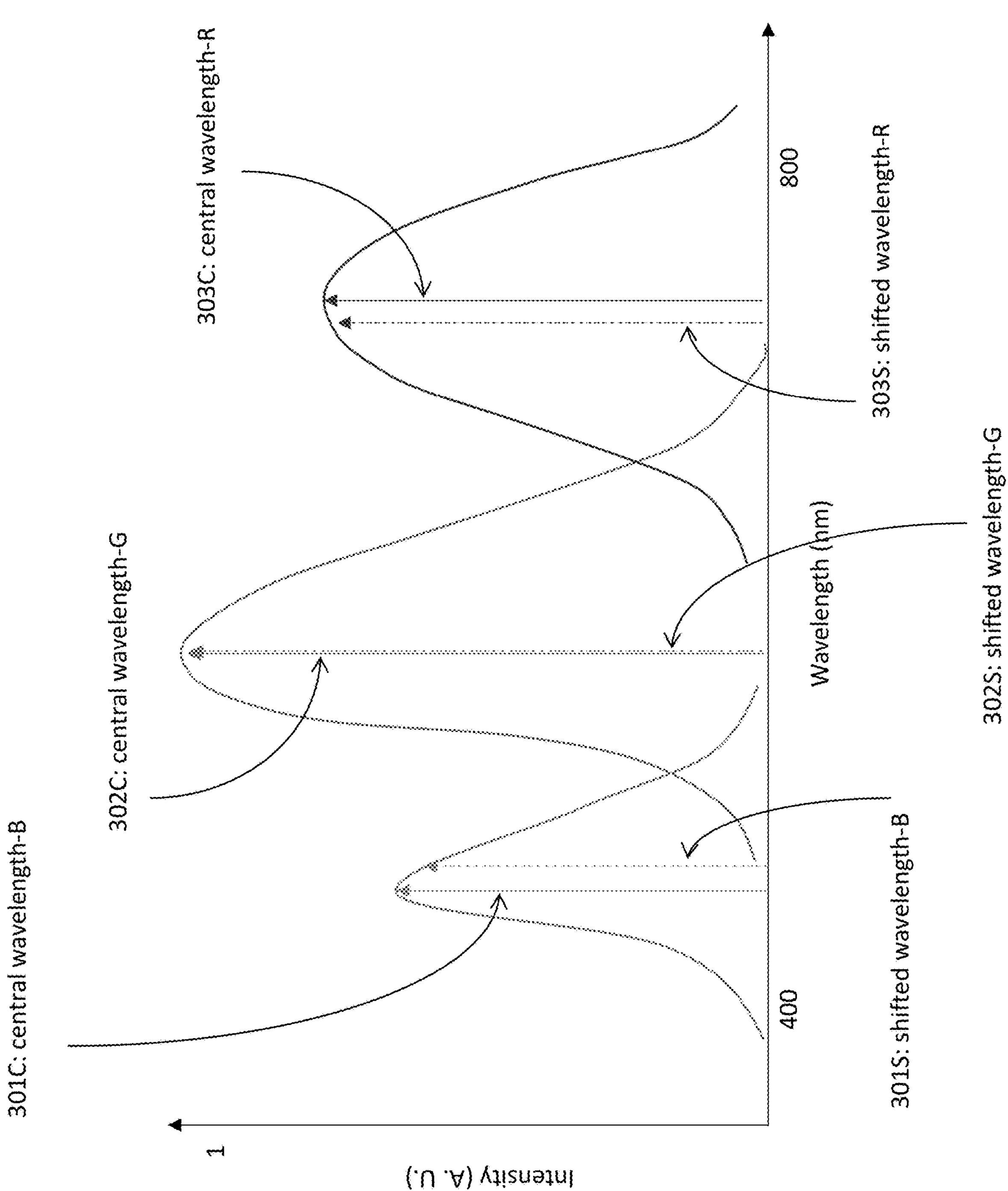
FIG. 3 is a plot of light intensity showing for each of R, G and B wavelengths a central peak and a shifted wavelength in the out-coupled light from a wedge-shaped EPE such as that shown at FIG. 2.

This is also shown in FIG. 3, where the spectra of the light sources are shown, with solid line indicators for the central (peak) wavelengths for Blue 301C; Green 302C and Red 303C as well as dashed line indicators for the shifted wavelengths for Blue 301S; Green 302S and Red 303S as seen by the user when the EPE is wedge-shaped as shown by the FIG. 2 example embodiment.

FIG. 4 reproduces the calculations for the color shifting plotted at FIG. 3. Green light input at the input grating has wavelength $\lambda$=525 nm; red light input has wavelength $\lambda$=630 nm; and blue light input has wavelength $\lambda$=430 nm. The wedge angle $\alpha$ shown at FIG. 2 is $\alpha$=0.25 degrees, the distance between slits on the input grating is d=1200 nm (consistent with the assumption above the input and output gratings are identical), $\theta_m$ is the diffraction angle at which phases add to produce a maxima, and air is the medium within the EPE. As can be seen from FIG. 4 the color shift $\Delta\lambda$ of green light is $\Delta\lambda\approx$(525-511 nm)=14 nm$\approx$2.5%; the color shift of red light is $\Delta\lambda\approx$(630-617 nm)=13 nm$\approx$2.0%; and the color shift of blue light is $\Delta\lambda\approx$(430-415 nm)=15 nm$\approx$3.5%. At least for the narrowing wedge shape the color shift is more pronounced for shorter wavelengths. FIG. 4 also shows the angular differences between the diffracted input and output angles. If the value of the angle $\alpha$ were set to zero the resulting EPE would be as shown at FIG. 1 and the calculations shown at FIG. 4 would return to the original (input) wavelength and the output angles would be equal to the input angles.

The basic wedge-shaped EPE 200 is only one of several EPE designs that will produce a color shift in the out-coupled light according to these teachings. While the FIG. 2 example shows the wedge narrowing between the input 202 (input grating 206) and the output (output grating 210) a similar color shifting benefit can be achieved with an expanding or widening wedge shape.

Figure 5:
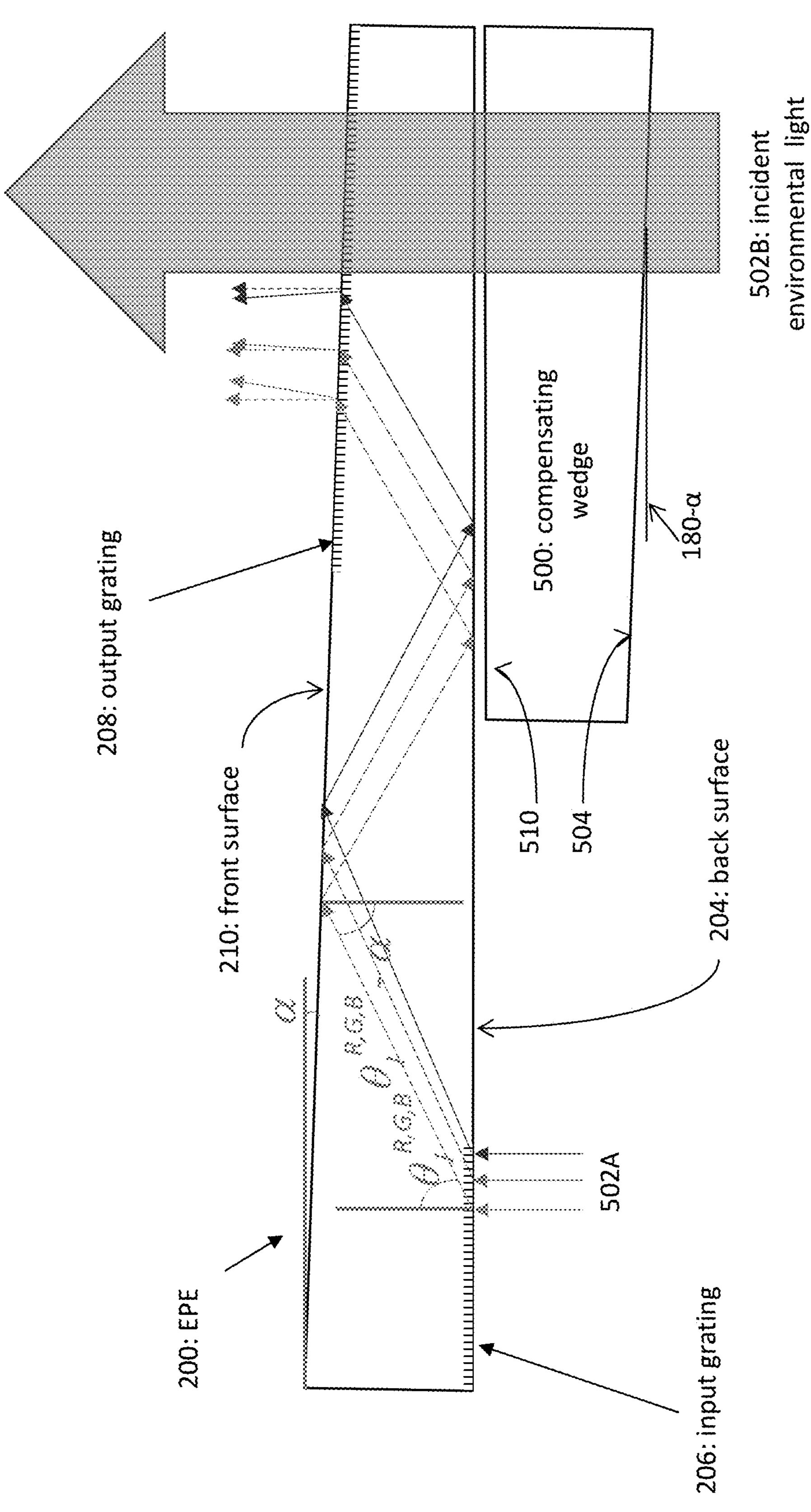
FIG. 5 is similar to FIG. 2 but further illustrating a compensating wedge for see-through (non-virtual reality) type applications according to an example embodiment.

FIG. 5 illustrates how a basic wedge-shape such as that shown at FIG. 2 can be adapted for a see-through display such as an eye-glass mounted micro-display that is transparent to visible light from the user's environment. Like reference numbers denote similar features as detailed above with respect to FIG. 2. For such a non-virtual reality device the user will want to perceive his/her surroundings without the color-shifting aspects imposed by the wedge shaped EPE 200. The incident light 202 forming the image to be projected in front of or on the user's eye is designated 502A in FIG. 5 to distinguish over the incident environmental light 502B that the user perceives directly that is not subject to internal reflection off the non-parallel surfaces 204, 210 within the EPE 200. That incident environmental light 502B passes through a compensating wedge 500 that defines opposed surfaces 510, 504 such that the surface 510 adjacent to the wedge-shaped EPE 200 is parallel to the back surface 204 of the EPE 200 and the surface opposite the EPE 200 is parallel to the front surface 210 of the EPE 200. So while the non-parallelism of the EPE 200 narrows between the input and output pupils, the compensating wedge widens to exactly match across the expanse of the compensating wedge 500 (or at least across the entrance and exit pupils of that compensating wedge 500). The angle $\alpha$ shown for the EPE 200 is the same angle $\alpha$ used for the compensating wedge 500 but offset 180 degrees (shown as $180-\alpha$ on the compensating wedge 500). Aberrations to the incident environmental light 502B due to the angular difference between opposed surfaces 204, 210 of the EPE 200 are exactly offset by the angular difference between opposed surfaces 510, 504 of the compensating wedge 500, which may even be separate from the EPE 200 waveguide.

Figure 6:
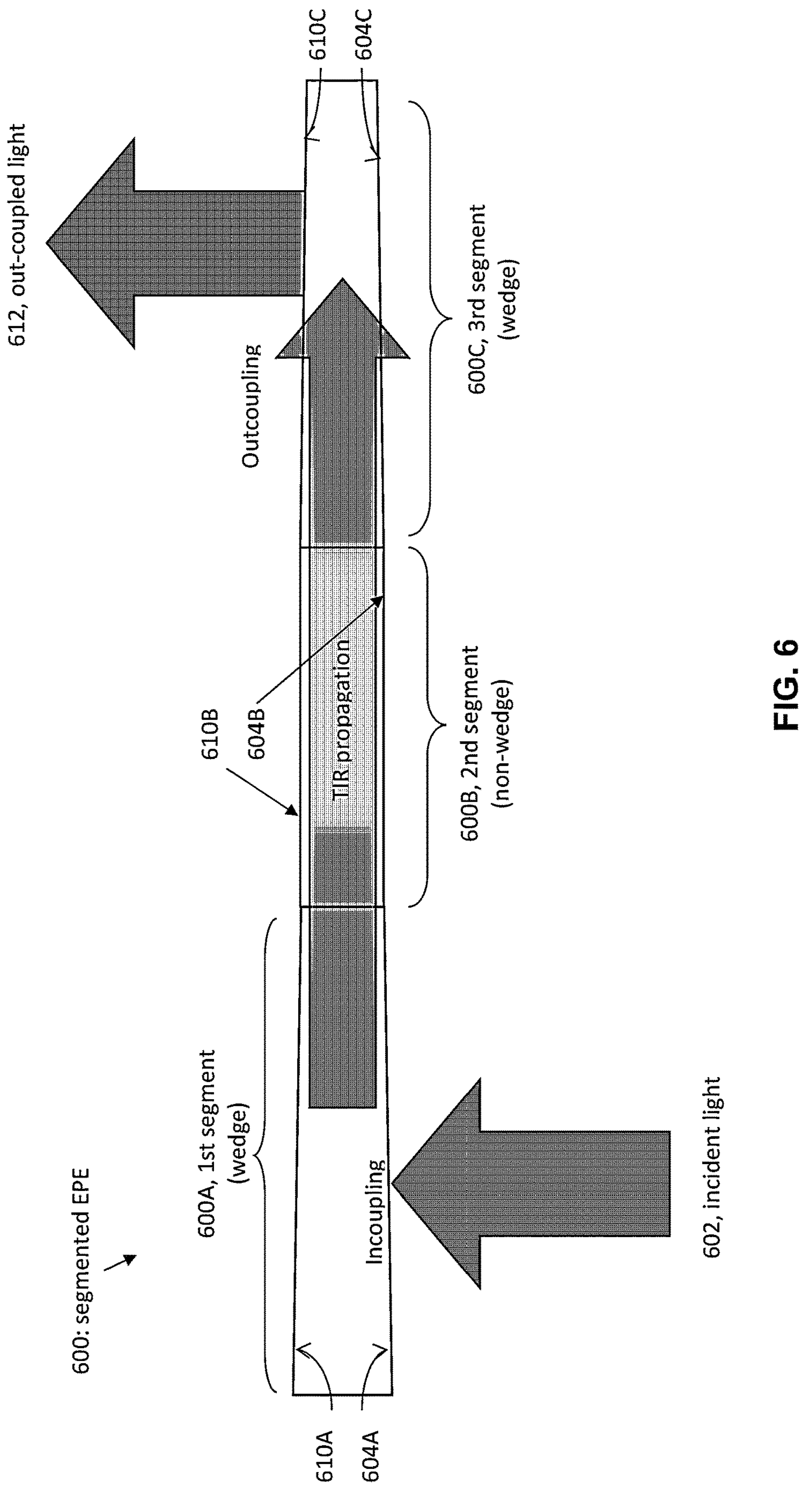
FIG. 6 is a schematic diagram of a segmented exit pupil expander defining multiple discrete segments of which less than all segments impose angularly varying total internal reflection according to these teachings.

Similar color-shifting advantages can be realized with one or more segmented wedge-shapes intermediate between the input and output of the EPE in which case the input and output surfaces at which the input and output gratings are disposed can be parallel themselves, as shown by example at FIG. 6. This segment-wise wedged EPE 600 defines three distinct segments 600A, 600B, 600C through which the incident light 602 propagates. Incident light 602 from the computer of the overall optical headset/eyeglass device forming the image to be projected is in-coupled through the back surface 604A of the first segment 600A which defines a narrowing wedge between opposed internal reflective surfaces 604A and 610A. From this first segment 600A the light continues through the second segment 600B which has parallel opposed internal reflective surfaces 604B, 610B. The light continues into the third segment 600C where it is out coupled 612 after reflecting between back 604C and front 610C surfaces which also define a narrowing wedge. In various embodiments there may be only one wedge segment 600A, 600C, and if there are multiple wedge segments 600A, 600C they may define the same or different wedge angles $\alpha$. At least input and output gratings similar to those shown at FIG. 2 are assumed though not shown at FIG. 6, and further the second segment 600B with parallel opposed surfaces 604B, 610B may also incorporate diffraction gratings along those surfaces.

It is known to incorporate into the design of an EPE intermediate vertical expansion gratings, which in FIG. 1 would run vertically between the opposed surfaces 104, 110. Where such vertical expansion gratings are used in a multi-segment EPE 600 such as that shown at FIG. 6 they are preferably disposed in the second segment 600B which exhibits a high degree of parallelism between the opposed surfaces 604B, 610B. In this case the wedge can be on either side of the non-wedge segment 600B in which the intermediate vertical expansion plates are disposed, or in other embodiments there may be one or more wedge segments before or after the non-wedge parallel segment 600B.

While the embodiments illustrated herein show non-parallel planar surfaces similar advantages can be gained where one or both of such surfaces are curved. The result is qualitatively similar in that the color expansion arises from the non-parallelism of these opposed reflective surfaces but the computations are more extensive to realize a practical EPE as compared to planar non-parallel surfaces.

Figure 7:
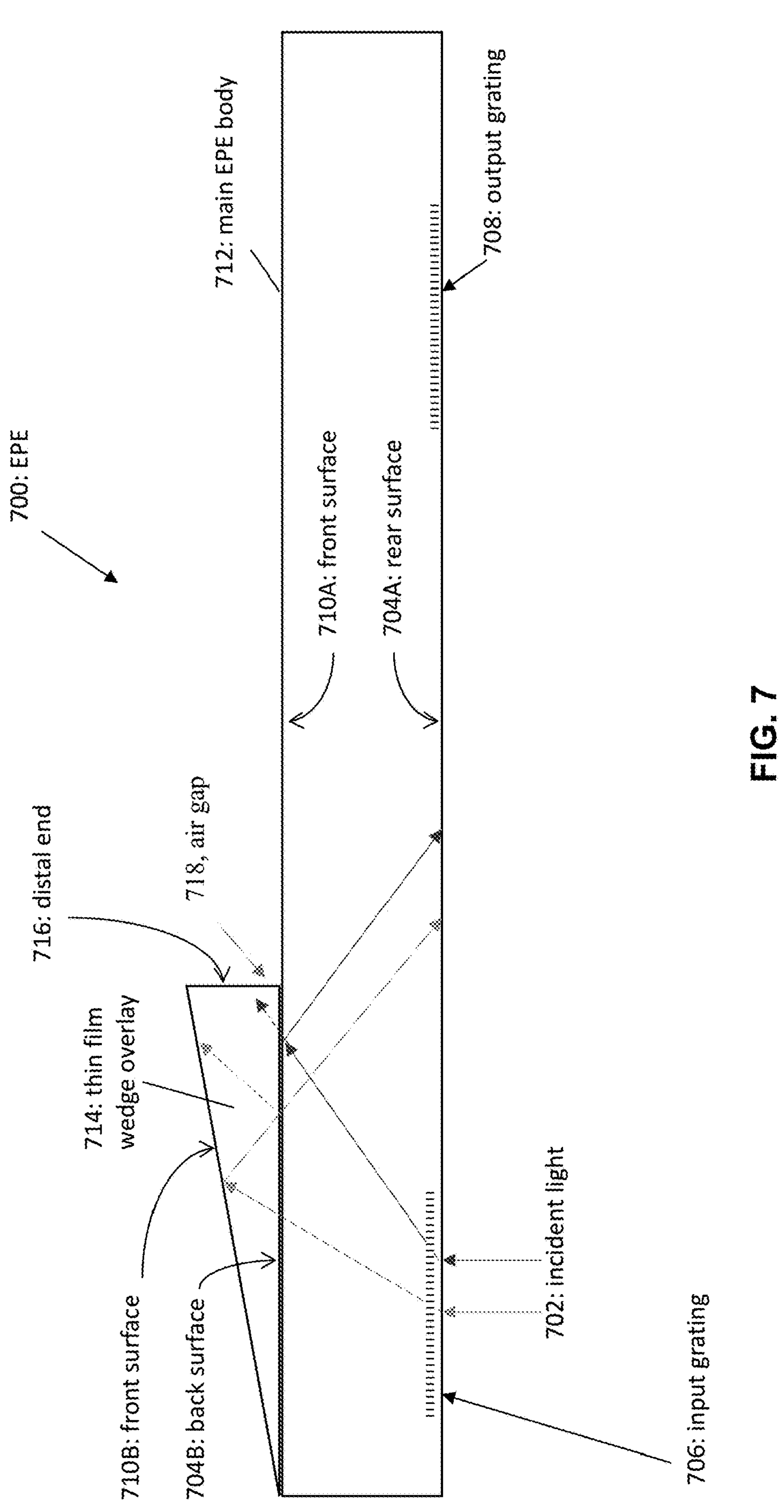
FIG. 7 is a schematic diagram of an exit pupil expander that includes a main channel or body with a thin film wedge overlay that imposes the angularly varying total internal reflection according to these teachings.

FIG. 7 illustrates a further embodiment of an EPE 700 in which there is a thin film wedge 714 overlying the front surface with a thin air gap 718 between the thin film wedge 714 and the main EPE body 712. Optical mediums other than air may also be used for this thin gap. For simplicity the main EPE body 712 has parallel opposed surfaces 704A, 710A. As with FIGS. 1 and 2 incident light 702 enters through the back surface 704A at the input grating 706 and is refracted internal of the channel between those surfaces 704A, 710A. The wedge overlay 714 is disposed opposite that input pupil such that the first refraction at the input grating directs the light towards the wedge overlay 714, which extends along only a portion of the main EPE body 712. The extent of that portion depends on the characteristics of that first diffraction angle and the wavelength or wavelengths the designer selects for evanescent coupling back into the optical channel of the main EPE body 712. The example at FIG. 7 shows blue and red light are incident 702; blue at the left and red at the right of the input grating 706. The blue light reflects into the thin film wedge 714 which extends far enough that a portion of this same blue light is also reflected from its front surface 710B through its back surface 704B to re-enter the main EPE body 712. The distal end 716 of the wedge overlay 714 prevents similar reflection of the red light that entered the wedge overlay 714 from being reflected back into that main EPE body 712. In this manner the 'leaky' input light can be filtered in and other wavelengths of light can be filtered out by selection of the wedge angle of the wedge overlay 714 and the position of the distal end 716 (for a given input grating 706).

In the FIG. 7 embodiment the output grating 708 is disposed along the rear surface 704A to show the advantages of these teachings do not depend on light being out-coupled from the surface opposite where it was in-coupled, and this feature can be incorporated into any of the other examples herein (except for the see-through embodiment of FIG. 5 it would be realized by in-coupling and out-coupling through the front surface 210 to retain the see-through feature). Some conventions prefer to name the surface adjacent to the output grating as the front surface, in which case surface 704A of FIG. 7 would be named the front surface and surface 710A would be named the back/rear surface; the terms front and back or rear surfaces as used herein merely designate opposing surfaces and the input/output pupils are specifically illustrated so there is no ambiguity. Note that the micro-display which provides the image seen by the user is not particularly shown at FIGS. 1-8; the micro-display and optical engine of the host device is the source of the incident light 702 that is in-coupled to the EPE via the input grating and out-coupled from it via the output grating. Micro-displays and optical engines to drive them are well known in the head-wearable visual imaging arts; these known micro-displays and optical engines are suitable for providing the image that is in-coupled to the EPE embodiments described herein and need not be further detailed. In some embodiments of optical devices such as retinal scanning displays the image is projected directly on the user's retina and such embodiments may or may not have any output grating at the exit pupil of the EPE.

Figures 8, 8A:
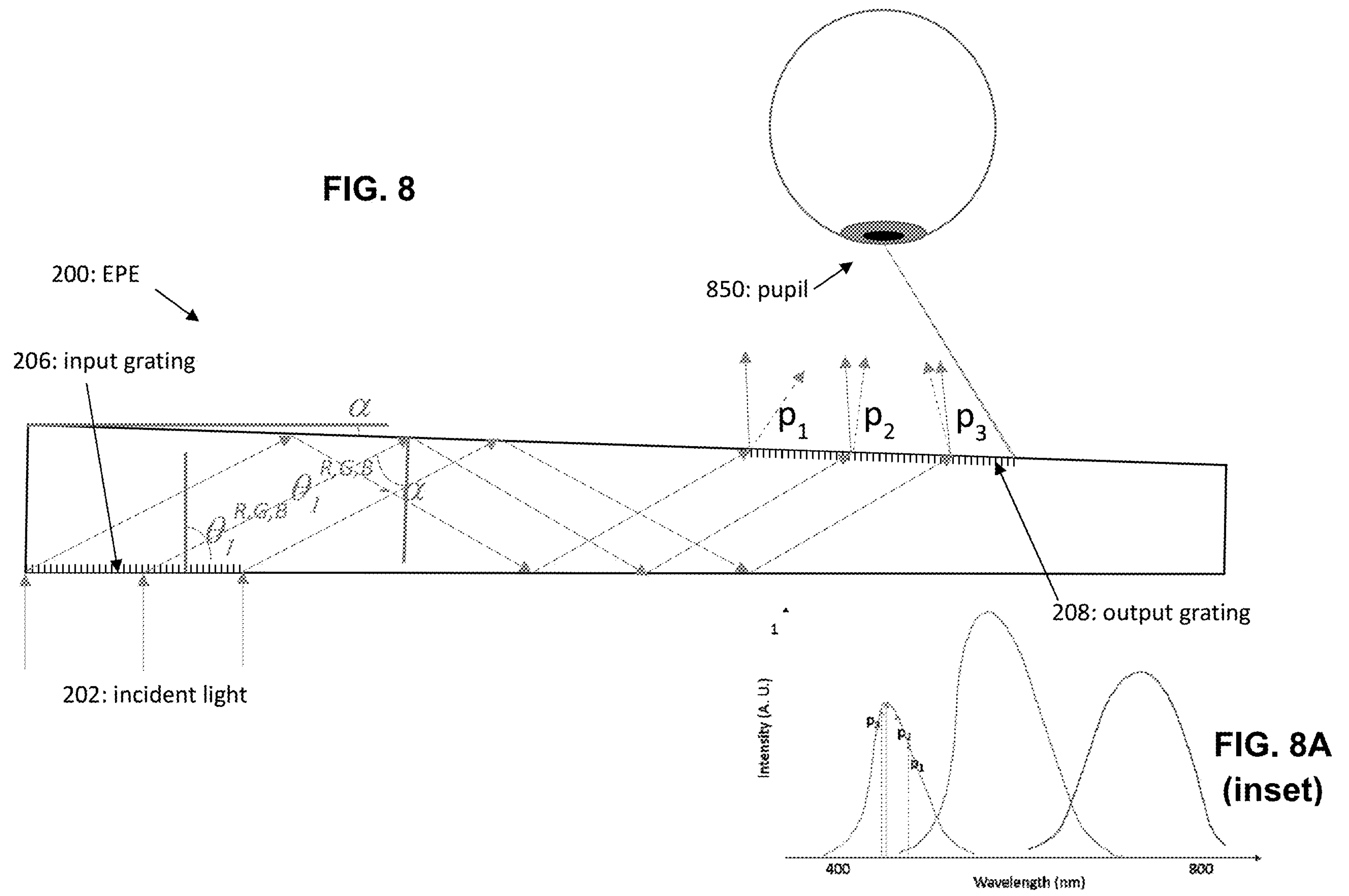
FIG. 8 is a schematic diagram of a wedge-type exit pupil expander similar to that of FIG. 2, but along with the inset FIG. 8A which is similar to FIG. 3 these more fully illustrate exit pupil expansion of only a single wavelength/color.

FIG. 8 illustrates a basic wedge-type EPE 200 similar to that shown at FIG. 2 but illustrating field of view aspects of these teachings; the inset at FIG. 8A is similar in kind to the data plot of FIG. 3. In this illustration the user's field of view is illustrated for only one color, blue which is incident 202 across the entire input grating 206 at zero degrees (normal to the plane of the grating). The solid arrows out-coupled from the output grating 208 represent the directions of the central peak of the color, and this central peak is also delineated at the inset with a solid arrow. The dashed arrows out-coupled from the output grating 208 show the side of the spectrum color that are coupled towards the user's pupil 850, where the dashed arrows $p_1$, $p_2$ and $p_3$ also illustrated at the inset. Note that those dashed arrows are on either side of the color peak even for this basic wedge design. When the user looks at the image projected on the output grating 208 the field of view has the color error that is imposed by the non-parallel channel of the EPE 200, so long as this error is not otherwise compensated within the EPE 200.

One particular technical effect of embodiments of these teachings is an improved color space provided by augmented reality and virtual reality viewing devices, and at a reduced cost. Such augmented reality or virtual reality devices would need to be designed such that the characteristics of the diffraction gratings take into account the wedge angle $\alpha$ but this would be an engineering matter more than compensated by volume sales of these retail end user devices.

Certain of the above embodiments may be described in part by its functionality as an optical channel (the EPE) comprising an entrance pupil enabling light to enter the optical channel; an exit pupil enabling the light to exit the optical channel; a back surface 204 adjacent to the entrance pupil; and a front surface 210 opposite the back surface. In the drawings the entrance pupil is designated by the input grating 206 and the exit pupil is designated by the output grating 208; while typical embodiments will have such gratings at those entrance and exit pupils the gratings themselves are not an essential part of the novel aspects of the optical channel/EPE presented herein. As detailed more particularly above the optical channel/EPE is geometrically configured, that is its shape is designed, such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. The dashed lines exiting the output grating 208 are perpendicular, and FIG. 3 as well as the inset FIG. 8A illustrate the shift of the dashed line wavelengths as compared to the solid-line peak which is the wavelength that entered the channel at the input grating 206.

Further to the aspects of the invention demonstrated by FIG. 3, in those embodiments the center wavelength (solid line) of the light is expanded by the angularly varying total internal reflection such that a) a first portion of the expanded light that exits the optical channel perpendicular to the exit pupil (the dashed lines) is at a wavelength shifted from the center wavelength; and b) a second portion of the expanded light that exits the optical channel non-perpendicular to the exit pupil (the solid lines) is at the center wavelength. The solid versus dashed line peaks at both FIGS. 3 and 8A show that this second portion of the expanded light that exits the optical channel non-perpendicular to the exit pupil exhibits a greater intensity than the first portion of the expanded light that exits the optical channel perpendicular to the exit pupil.

In the described embodiments the optical channel is geometrically configured such that the front surface and the back surface are non-parallel. While flat non-parallel surfaces are shown curved surfaces can also be employed to take advantage of these teachings. In the specific embodiment of FIG. 5 for a non-virtual reality implementation, the front surface 210 is adjacent to the exit pupil and the optical channel 200 is a see-through exit pupil expander further comprising a compensating wedge 500 disposed adjacent to a portion of the back surface 204 opposite the exit pupil, and this compensating wedge is transparent to incident environmental light 502B and is further geometrically configured to offset angular variance that the optical channel 200 imposes on incident environmental light 502B that passes into the optical channel via the compensating wedge.

FIG. 6 demonstrated an example of a segmented EPE 600, and in this case the front and back surfaces define at least first (600B) and second (600A and/or 600C) discrete geometric segments of the optical channel, wherein the front and back surfaces are parallel in the first discrete geometric segment 600B and non-parallel in at least the second discrete geometric segment 600A/600C.

Another embodiment shown particularly at FIG. 7 had the optical channel/EPE comprising a main channel or body 712 and a wedge overlay 714. In this case the front and back surfaces mentioned above would be considered the front 710A and rear 704A surfaces of the main channel 712; the wedge overlay would define non-parallel front 710B and back 704B overlay surfaces; the wedge overlay would be disposed adjacent to the front surface 710A of the main channel opposite the entrance pupil; and at least some of the angularly varying total internal reflection between the front and back surfaces are between the front surface 710B of the wedge overlay 714 and the back surface 704A of the main channel 712. For simplicity but not by way of limitation we can assume an embodiment with a wedge overlay in which the front 710A and rear 704A surfaces of the main channel 712 are parallel; a particularly useful aspect of the wedge overlay concept is that disposition of a distal end 716 of the wedge overlay 714 relative to the entrance pupil filters incident light 702 passing through the entrance pupil such that only wavelengths above or below a threshold experience the angularly varying total internal reflection while remaining wavelengths experience total internal reflection that is not angularly varying. These are respectively shown by the leftmost ray entering the input grating 706 which is reflected from the front overlay surface 710B back into the main channel 712 and by the rightmost ray entering the input grating 706 which is not reflected 710B back into the main channel 712 from the wedge overlay 714 due to the location of the distal end 716.

Alternatively, certain embodiments of these teachings may be described by the channel's geometry and without functional terms. For example, such an optical channel 200 comprises an entrance pupil enabling light 202 to enter the optical channel; an exit pupil enabling the light to exit the optical channel; a back surface 204 adjacent to the entrance pupil; and a front surface 210 opposite the back surface. As above, the drawings depict the entrance pupil as the input grating 206 and the exit pupil as the output grating 208, and such gratings may be common to most implementations but are not essential, particularly the output grating is not needed if the host device is of the retinal scanning variety. In this way of describing the invention the optical channel is configured such that a first distance 220 at the entrance pupil between the front surface 210 and the back surface 204 is different from a second distance 222 at the exit pupil between the front surface 210 and the back surface 204.

In one such embodiment such as that shown at FIGS. 2 and 5, the front and back surfaces of the optical channel are configured to form a continuous wedge defining an angle $\alpha$ that quantifies an amount of non-parallelism between them. Those particularly illustrated embodiments have the first distance greater than the second distance, but an opposite arrangement is also possible within these teachings.

Though the FIG. 5 embodiment is shown as a continuous wedge this is a non-limiting feature of the see-through/non-virtual reality embodiment of the exit pupil expander where the front surface 210 is adjacent to the exit pupil. In this embodiment the see-through exit pupil expander further comprises a compensating wedge 500 disposed adjacent to a portion of the back surface 204 opposite the exit pupil, and as detailed above this compensating wedge is transparent to incident environmental light 502B and geometrically configured to offset exit pupil expansion that the optical channel/EPE 200 imposes on incident environmental light 502B that passes into the optical channel/EPE via the compensating wedge 500.

The FIG. 6 embodiment has the front and back surfaces defining at least first and second discrete geometric segments of the optical channel, wherein the front and back surfaces are parallel in the first discrete geometric segment and non-parallel in at least the second discrete geometric segment as detailed above in the functional description of the FIG. 6 embodiment.

The embodiment detailed with respect to FIG. 7 has the optical channel comprising a main channel 712 and a wedge overlay 714, and this also is fully described above in the functional description of this embodiment.

Embodiments of these teachings include the overall host device in which such an optical channel/EPE may be deployed. Such a host device is shown by example at FIG. 9 as a head-wearable imaging device which comprises a micro display that would be disposed at the image source 904 and an exit pupil expander disposed between the source 904 and the eyepiece as shown. In such embodiments the exit pupil expander may be as detailed more particularly above with entrance and exit pupils to respectively in-couple and out-couple light from the micro-display and front and back surfaces to angularly vary the total internal reflection of the light passing between those pupils. In some embodiments at least a portion of these front and back surfaces are non-parallel to one another and this region is where the light experiences the angularly varying total internal reflection; as particularly shown at FIGS. 2 and 5-8 these non-parallel portions are flat. In some deployments the head-wearable imaging device is a virtual reality imaging device that isolates the user's field of view from the surrounding environment. In other deployments the head-wearable imaging device is an augmented reality device such as the particular example shown at FIG. 9, in which case there may further be a compensating wedge along the lines of the example at FIG. 5 and disposed opposite the exit pupil such that incident environmental light 502B passes into the exit pupil expander 200 through the compensating wedge 500 and passes out of the exit pupil expander through the exit pupil without total internal reflection.

Figure 9:
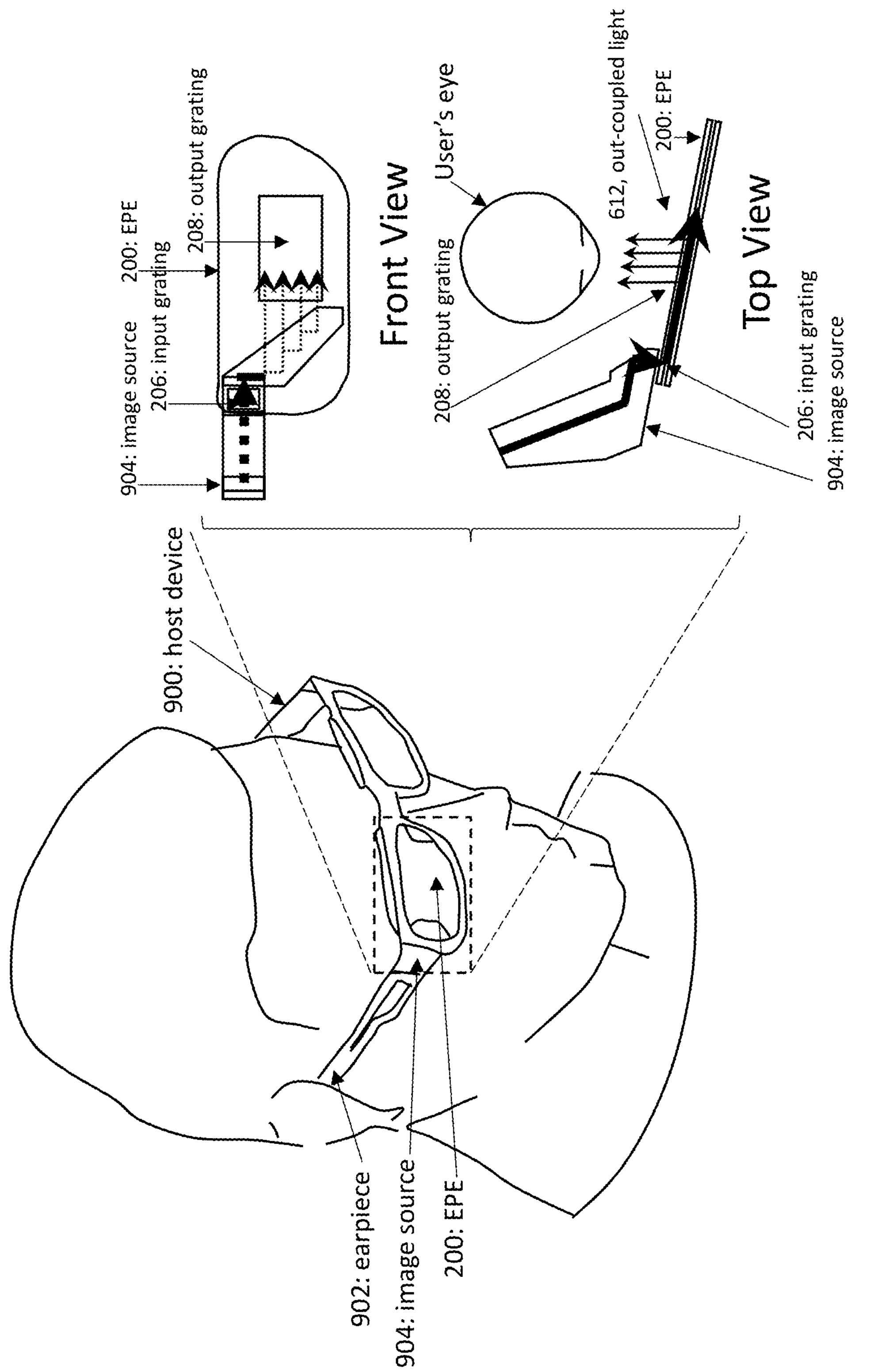
FIG. 9 is a perspective view of a non-virtual reality headset which is one type of device 900 in which embodiments of these teachings may be disposed, with front and top views particularly illustrating one example for placement of an EPE.

FIG. 9 is a perspective view of a non-virtual reality headset which is one type of device 900 in which embodiments of these teachings may be disposed. Typically in host devices that are implemented as eyeglasses such as the host device 900 shown at FIG. 9 the EPE 200 would be disposed to lie along the user's temple when the device is worn, either within the earpiece 902 or separately but substantially alongside the earpiece as FIG. 9 specifically shows. For virtual reality type host devices the EPE 200 may be disposed along the user's temple as FIG. 9 illustrates, or it may be disposed to run laterally along the user's face from the temple to the eye center. In any case there is a computer based image source 904 that provides the incident light to the entrance aperture/input grating for expansion and projection at or from the exit pupil/output grating. In some embodiments the image source 904 may generate the image itself, in others it may include a wireless receiver that receives the digitized image over a Bluetooth or other wireless connection and simply renders the received image for visual presentation.

The various embodiments presented herein provide a fuller appreciation for the scope of the teachings herein, but these are examples and do not themselves represent an inherent limit to the various types of embodiments that can exploit the teachings herein, whether such embodiments relate to the EPE itself or as to how it may be disposed on or within a host device.

What is claimed is:

1. A method of operating an optical channel comprising:
directing light through an entrance pupil of an optical channel body, wherein an exit pupil enables the light to exit the optical channel body, wherein the optical channel body is geometrically configured such that a front surface and a back surface form a continuous wedge defining an angle $\alpha$ that quantifies an amount of non-parallelism between the front surface and the back surface and between a plane of the entrance pupil and a plane of the exit pupil, a first distance at the entrance pupil between the front surface and the back surface is greater than a second distance at the exit pupil between the front surface and the back surface, and wherein light defining a center wavelength that enters the optical channel body at the entrance pupil perpendicular to the back surface experiences angularly varying total internal reflection between the front and back surfaces such that the light that exits the optical channel body perpendicular to the exit pupil is at a wavelength shifted from the center wavelength.

2. The method of claim 1, wherein the front and back surfaces define at least first and second discrete geometric segments of the optical channel body, wherein the front and back surfaces are parallel in the first discrete geometric segment and non-parallel in at least the second discrete geometric segment.

3. The method of claim 1, wherein the light defining the center wavelength is expanded by the angularly varying total internal reflection such that:

a first portion of the expanded light that exits the optical channel body perpendicular to the exit pupil is at a wavelength shifted from the center wavelength; and a second portion of the expanded light that exits the optical channel body non-perpendicular to the exit pupil is at the center wavelength.

4. The method of claim 3, wherein:

the second portion of the expanded light that exits the optical channel body non-perpendicular to the exit pupil exhibits a greater intensity than the first portion of the expanded light that exits the optical channel body perpendicular to the exit pupil.

5. The method of claim 1, wherein the front surface is adjacent to the exit pupil and the optical channel body is a see-through exit pupil expander further comprising:

a compensating wedge disposed adjacent to a portion of the back surface opposite the exit pupil, said compensating wedge transparent to incident environmental light and geometrically configured to offset angular variance the optical channel body imposes on incident environmental light that passes into the optical channel body via the compensating wedge.

6. The method of claim 5, wherein the compensating wedge has a surface that is at the angle $\alpha$ relative to the plane of the entrance pupil.

7. The method of claim 5, comprising a wedge overlay, wherein:

the said front and back surfaces are front and back surfaces of the optical channel body;

the wedge overlay defines non-parallel front and back overlay surfaces;

the wedge overlay is disposed adjacent to the front surface of the optical channel body opposite the entrance pupil; and at least some of the angularly varying total internal reflection between the front and back surfaces are between the front surface of the wedge overlay and the back surface of the optical channel body.

8. The method of claim 7, wherein:

disposition of a distal end of the wedge overlay relative to the entrance pupil filters incident light passing through the entrance pupil such that only wavelengths above or below a threshold experience the angularly varying total internal reflection while remaining wavelengths experience total internal reflection that is not angularly varying.

9. A method of operating an optical channel comprising:

directing light through an entrance pupil of an optical channel body, wherein the optical channel body is configured such that front and back surfaces of the optical channel form a continuous wedge defining an angle $\alpha$ that quantifies an amount of non-parallelism between the front surface and the back surface and between a plane of the entrance pupil and a plane of the exit pupil, light that enters the optical channel body at the entrance pupil experiences total internal reflection between the front and back surfaces, and a first distance at the entrance pupil between the front surface and the back surface is greater than a second distance at the exit pupil between the front surface and the back surface, wherein the front surface is adjacent to the exit pupil and the optical channel body is a see-through exit pupil expander further comprising:

a compensating wedge disposed adjacent to a portion of the back surface opposite the exit pupil, said compensating wedge transparent to incident environmental light and geometrically configured to offset exit pupil expansion that the optical channel body imposes on incident environmental light that passes into the optical channel body via the compensating wedge.

10. The method of claim 9, wherein the front and back surfaces define at least first and second discrete geometric segments of the optical channel body, wherein the front and back surfaces are parallel in the first discrete geometric segment and non-parallel in at least the second discrete geometric segment.

11. The method of claim 9 comprising a wedge overlay, wherein:

the front and back surfaces are front and back surfaces of the optical channel body;

the wedge overlay defines non-parallel front and back overlay surfaces;

the wedge overlay is disposed adjacent to the front surface of the optical channel body opposite the entrance pupil such that the first distance is between the back surface of the optical channel body and the front overlay surface; and at least some of the light entering the optical channel body via the entrance pupil is reflected from the front overlay surface back into the optical channel body towards the back surface of the optical channel body.

12. The method of claim 11, wherein:

disposition of a distal end of the wedge overlay relative to the entrance pupil filters incident light passing through the entrance pupil such that only wavelengths above or below a threshold are reflected from the front overlay surface into the optical channel body while remaining wavelengths reflected from the front overlay surface are not.

13. A method of operating an optical channel comprising a wedge overlay, the method comprising:

directing light through an entrance pupil of an optical channel body, wherein the optical channel body is configured such that front and back surfaces of the optical channel form a continuous wedge defining an angle $\alpha$ that quantifies an amount of non-parallelism between the front surface and the back surface and between a plane of the entrance pupil and a plane of the exit pupil, light that enters the optical channel body at the entrance pupil experiences total internal reflection between the front and back surfaces, and a first distance at the entrance pupil between the front surface and the back surface is greater than a second distance at the exit pupil between the front surface and the back surface, wherein:

the front and back surfaces are front and back surfaces of the optical channel body;

the wedge overlay defines non-parallel front and back overlay surfaces;

the wedge overlay is disposed adjacent to the front surface of the optical channel body opposite the entrance pupil such that the first distance is between the back surface of the optical channel body and the front overlay surface; and at least some of the light entering the optical channel body via the entrance pupil is reflected from the front overlay surface back into the optical channel body towards the back surface of the optical channel body.

14. The method of claim 13, wherein the front and back surfaces define at least first and second discrete geometric segments of the optical channel body, wherein the front and back surfaces are parallel in the first discrete geometric segment and non-parallel in at least the second discrete geometric segment.

15. The method of claim 13, wherein:

disposition of a distal end of the wedge overlay relative to the entrance pupil filters incident light passing through the entrance pupil such that only wavelengths above or below a threshold are reflected from the front overlay surface into the optical channel body while remaining wavelengths reflected from the front overlay surface are not.

* * * * *